United States Patent
Jung et al.

(10) Patent No.: US 10,440,629 B2
(45) Date of Patent: Oct. 8, 2019

(54) SYNCHRONIZATION REFERENCE TERMINAL SELECTION METHOD PERFORMED BY TERMINAL IN WIRELESS COMMUNICATION SYSTEM, AND TERMINAL USING SAME METHOD

(71) Applicant: LG Electronics Inc., Seoul (KR)

(72) Inventors: Sunghoon Jung, Seoul (KR); Jaewook Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 35 days.

(21) Appl. No.: 15/564,295

(22) PCT Filed: Apr. 8, 2016

(86) PCT No.: PCT/KR2016/003733
§ 371 (c)(1),
(2) Date: Oct. 4, 2017

(87) PCT Pub. No.: WO2016/163822
PCT Pub. Date: Oct. 13, 2016

(65) Prior Publication Data
US 2018/0139681 A1     May 17, 2018

Related U.S. Application Data

(60) Provisional application No. 62/144,348, filed on Apr. 8, 2015, provisional application No. 62/144,998, filed on Apr. 9, 2015.

(51) Int. Cl.
*H04W 40/22*     (2009.01)
*H04W 56/00*     (2009.01)
(Continued)

(52) U.S. Cl.
CPC .......... *H04W 40/22* (2013.01); *H04W 8/005* (2013.01); *H04W 56/0015* (2013.01); *H04W 48/12* (2013.01); *H04W 88/04* (2013.01)

(58) Field of Classification Search
CPC ............... H04W 40/22; H04W 56/001; H04W 56/0015; H04W 76/14; H04W 76/23; H04W 88/04
See application file for complete search history.

(56) References Cited

U.S. PATENT DOCUMENTS

2015/0036578 A1*   2/2015   Wu ..................... H04W 4/06
                                                             370/312
2016/0212721 A1*   7/2016   Sheng .............. H04W 56/0015

FOREIGN PATENT DOCUMENTS

| KR | 10-2015-0015266 A | 2/2015 |
| WO | 2015-003365 A1    | 1/2015 |
| WO | 2015-006082 A1    | 1/2015 |

OTHER PUBLICATIONS

Ericsson, "LS on D2D Synchronization Procedure", R2-145338, 3GPP TSG RAN WG2 Meeting #88, San Francisco, USA, Nov. 22, 2014, p. 1.

(Continued)

*Primary Examiner* — Pao Sinkantarakorn
(74) *Attorney, Agent, or Firm* — Dentons US LLP

(57) ABSTRACT

The present invention provides a device-to-device (D2D) operation method performed by a remote terminal in a wireless communication system, the method comprising receiving system information from candidates of a relay terminal which provides a relay service between a cellular link and a side link; and determining, as a synchronization reference terminal, any one terminal from among the candidate relay terminals on the basis of the system information, wherein the relay terminal of the remote terminal and the synchronization reference terminal is the same.

11 Claims, 17 Drawing Sheets

(51) Int. Cl.
*H04W 8/00* (2009.01)
*H04W 88/04* (2009.01)
*H04W 48/12* (2009.01)

(56) References Cited

OTHER PUBLICATIONS

Ericsson, "On Synchronization Heads", R1-140779, 3GPP TSG-RAN WG1 Meeting #76, Prague, Czech Republic, Feb. 1, 2014, Section 1-2.
3GPP TS 36.304 V8.5.0 (Mar. 2009), 3rd Generation Partnership Project; Technical Specification Group Radio Access Network; Evolved Universal Terrestrial Radio Access (E-UTRA); User Equipment (UE) procedures in idle mode (Release 8).

* cited by examiner

SYNCHRONIZATION REFERENCE TERMINAL SELECTION METHOD PERFORMED BY TERMINAL IN WIRELESS COMMUNICATION SYSTEM, AND TERMINAL USING SAME METHOD

CROSS-REFERENCE TO RELATED APPLICATIONS

This application is the National Stage filing under 35 U.S.C. 371 of International Application No. PCT/KR2016/003733, filed on Apr. 8, 2016, which claims the benefit of U.S. Provisional Applications No. 62/144,348 filed on Apr. 8, 2015, and No. 62/144,998 filed on Apr. 9, 2015, the contents of which are all hereby incorporated by reference herein in their entirety.

BACKGROUND OF THE INVENTION

Field of the Invention

The present invention relates to wireless communication and, more particularly, to a D2D operation method performed by a terminal in a wireless communication system and a terminal using the same.

Related Art

In ITU-R (International Telecommunication Union Radio communication sector), standardization of IMT (International Mobile Telecommunication)-Advanced which is a next-generation mobile communication system following the third generation mobile communication system is performed. IMT-Advanced aims to support IP (Internet Protocol) based multimedia services with a rate of 1 Gbps in a stop and low-speed moving state and 100 Mbps in a high-speed moving state.

3GPP (3rd Generation Partnership Project) is a system standard which meets requirements of IMT-Advanced and prepares LTE (Long Term Evolution)-Advanced (LTE-A) evolving from LTE based on OFDMA (Orthogonal Frequency Division Multiple Access)/SC-FDMA (Single Carrier-Frequency Division Multiple Access) transmission schemes. LTE-A is a leading candidate for IMT-Advanced.

Recently, there is increasing interest in D2D (Device-to-Device) technology based on direct communication between devices. Particularly, D2D attracts attention as a communication technology for a public safety network. While commercial communication networks rapidly change to LTE, current public safety networks are based on 2G technology due to problems of collision with existing communication protocols and cost. Demand for improvement of such technical differences and services has led to efforts to enhance public safety networks.

Public safety networks have higher service requirements (reliability and security) than commercial communication networks and, particularly, require direct signal transmission and reception between devices, that is, D2D operation, even when coverage of cellular communication does not cover the networks or is not available.

D2D operation may have various advantages in terms of signal transmission and reception between devices adjacent to each other. For example, D2D UEs can perform data communication with high transfer rate and low delay. In addition, D2D operation can disperse traffic converging on a base station, and if a D2D UE serves as a relay, can extend coverage of the base station.

Recently, a UE serving as a relay which connects a side link and a cellular link, that is, a relay UE, has been introduced in D2D operation. A remote UE performing D2D operation can select a UE for which synchronization will be performed, that is, a synchronization reference target UE. Here, the remote UE can select a UE which does not provide a relay service instead of a UE which provides the relay service as a synchronization reference UE. When a relay UE selected by the remote UE differs from a UE which is a basis of synchronization (i.e., synchronization reference UE), asynchronization between the remote UE and the relay UE may decrease D2D operation efficiency and the remote UE cannot receive appropriate data from the relay UE when the remote UE performs D2D operation through the relay UE.

SUMMARY OF THE INVENTION

An object of the present invention is to provide a D2D operation method performed by a UE in a wireless communication system and a UE using the same.

In an aspect, a method for device-to-device (D2D) operation performed by a remote UE in a wireless communication system is provided. The method may comprise receiving system information from candidate relay UEs and determining any one of the candidate relay UEs as a synchronization reference UE on the basis of the system information, the determined synchronization reference UE is the same as a relay UE of the remote UE, which provides a relay service between a cellular link and a sidelink.

The system information may include information indicating whether a candidate relay UE transmitting the system information corresponds to an in-coverage UE.

The system information may include information indicating whether a candidate relay UE transmitting the system information supports relay.

Determining of any one of the candidate relay UEs as a synchronization reference UE on the basis of the system information may comprise determining the candidate relay UE as the synchronization reference UE when the information indicating whether a candidate relay UE corresponds to an in-coverage UE indicates that the candidate relay UE corresponds to an in-coverage UE and the information indicating whether a candidate relay UE supports relay indicates that the candidate relay UE is a relay support UE.

When the candidate relay UEs include multiple UEs corresponding to in-coverage and supporting relay, a UE having highest measured quality among the multiple UEs may be determined as the synchronization reference UE.

The system information may include information indicating functionality provided by a relay candidate UE.

The information indicating functionality may be information indicating whether the relay candidate UE supports relay of a multimedia broadcast multicast service (MBMS).

Determining of any one of the candidate relay UEs as a synchronization reference UE on the basis of the system information may comprise determining a relay candidate UE as the synchronization reference UE when the remote UE wants to be provided with the MBMS and the relay candidate UE provides the MBMS.

The system information may include information about groups to which relay candidate UEs provide services.

Determining of any one of the candidate relay UEs as a synchronization reference UE on the basis of the system information may comprise determining a relay candidate UE as the synchronization reference UE when information about the remote UE is included in information about a group to which the relay candidate UE provides a service.

Selection of the synchronization reference UE may be performed on an access stratum (AS).

In another aspect, a user equipment (UE) is provided. The UE may comprise a radio frequency (RF) unit for transmitting and receiving RF signals and a processor operating in connection with the RF unit, the processor is configured to receive system information from candidate relay UEs and to determine any one of the candidate relay UEs as a synchronization reference UE on the basis of the system information, the determined synchronization reference UE being the same as a relay UE of the remote UE, which provides a relay service between a cellular link and a sidelink.

According to the present invention, a D2D operation method performed by a UE in a wireless communication system and a UE using the same are provided.

According to the present invention, a D2D operation method performed by a remote UE in a wireless communication system and a remote UE using the same are provided.

According to the present invention, a D2D operation method performed by a relay UE in a wireless communication system and a relay UE using the same are provided.

According to the present invention, when a remote UE selects a synchronization reference UE, a relay UE of the remote UE can be selected as a synchronization reference UE of the remote UE. Accordingly, when the remote UE performs D2D operation through the relay UE, synchronization between the remote UE and the relay UE is performed within an appropriate range and D2D operation efficiency deterioration due to asynchronization between the remote UE and the relay UE is prevented. Accordingly, reliability of D2D operation, that is, communication between the remote UE, the relay UE and a network can be improved to maximize communication efficiency of the wireless communication system.

DESCRIPTION OF EXEMPLARY EMBODIMENTS

Figure 1:
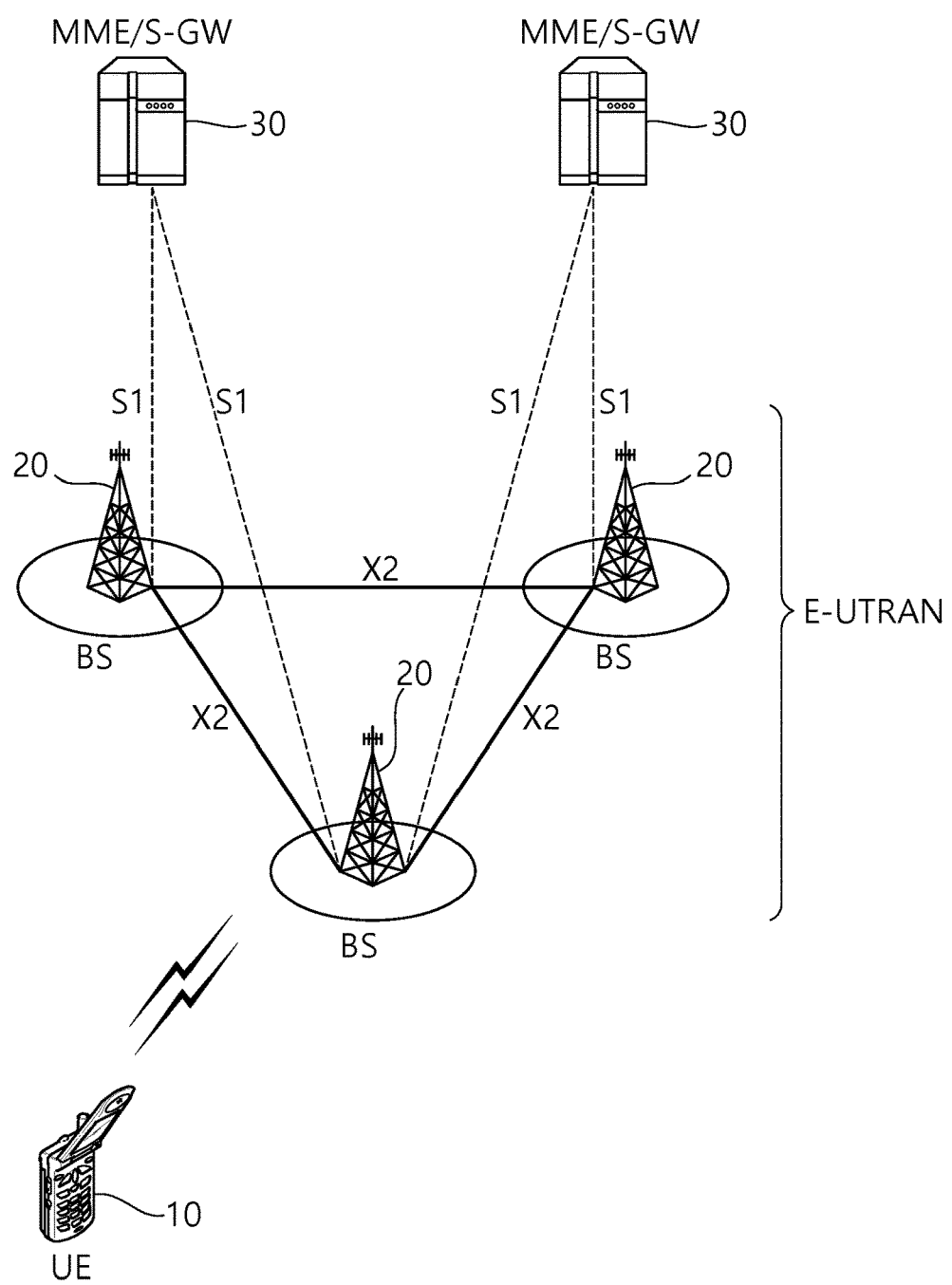
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
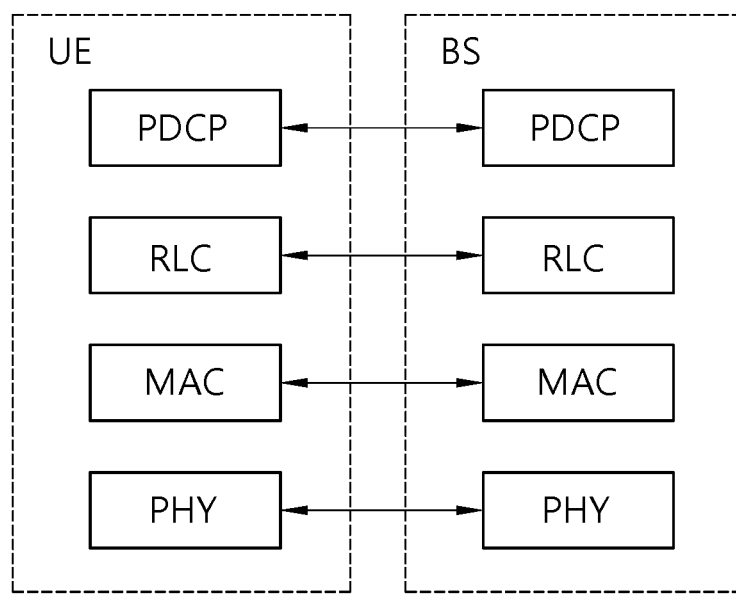
FIG. 2 is a diagram showing a wireless protocol architecture for a user plane.
Figure 3:
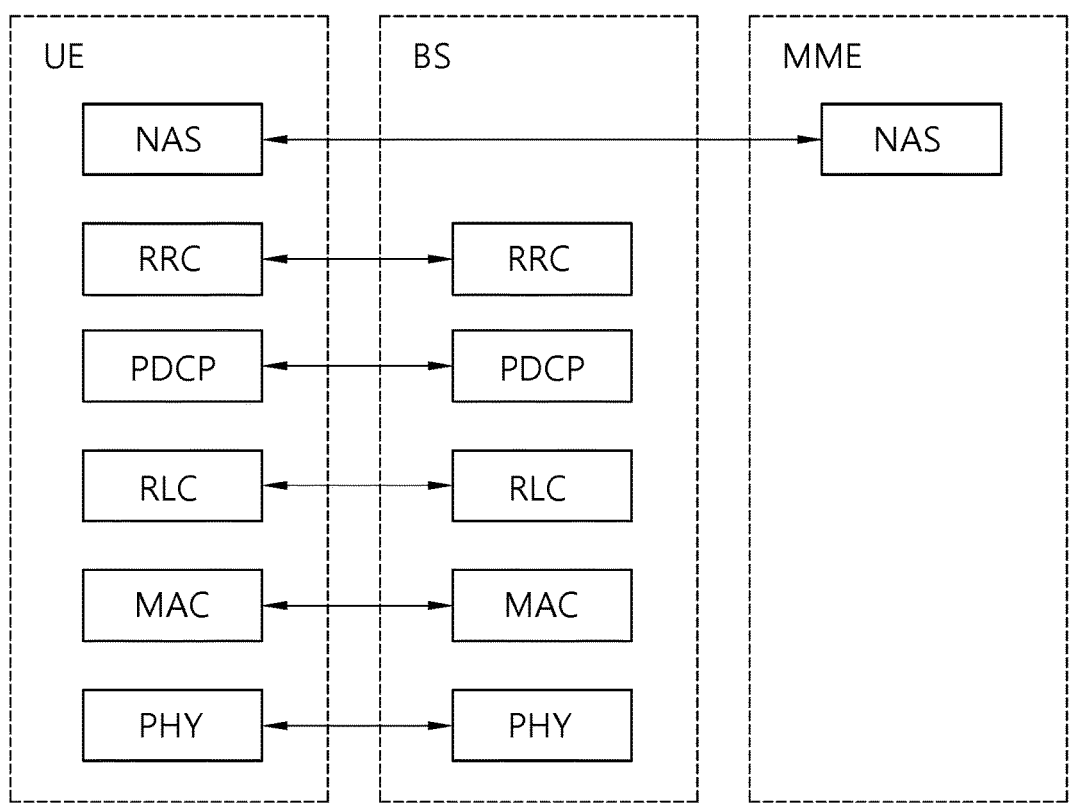
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

The RRC state of UE and an RRC connection method are described below.

The RRC state means whether or not the RRC layer of UE is logically connected to the RRC layer of the E-UTRAN. A case where the RRC layer of UE is logically connected to the RRC layer of the E-UTRAN is referred to as an RRC connected state. A case where the RRC layer of UE is not logically connected to the RRC layer of the E-UTRAN is referred to as an RRC idle state. The E-UTRAN may check the existence of corresponding UE in the RRC connected state in each cell because the UE has RRC connection, so the UE may be effectively controlled. In contrast, the E-UTRAN is unable to check UE in the RRC idle state, and a Core Network (CN) manages UE in the RRC idle state in each tracking area, that is, the unit of an area greater than a cell. That is, the existence or non-existence of UE in the RRC idle state is checked only for each large area. Accordingly, the UE needs to shift to the RRC connected state in order to be provided with common mobile communication service, such as voice or data.

When a user first powers UE, the UE first searches for a proper cell and remains in the RRC idle state in the corresponding cell. The UE in the RRC idle state establishes RRC connection with an E-UTRAN through an RRC connection procedure when it is necessary to set up the RRC connection, and shifts to the RRC connected state. A case where UE in the RRC idle state needs to set up RRC connection includes several cases. For example, the cases may include a need to send uplink data for a reason, such as a call attempt by a user, and to send a response message as a response to a paging message received from an E-UTRAN.

A Non-Access Stratum (NAS) layer placed over the RRC layer performs functions, such as session management and mobility management.

In the NAS layer, in order to manage the mobility of UE, two types of states: EPS Mobility Management-REGISTERED (EMM-REGISTERED) and EMM-DEREGISTERED are defined. The two states are applied to UE and the MME. UE is initially in the EMM-DEREGISTERED state. In order to access a network, the UE performs a procedure of registering it with the corresponding network through an initial attach procedure. If the attach procedure is successfully performed, the UE and the MME become the EMM-REGISTERED state.

In order to manage signaling connection between UE and the EPC, two types of states: an EPS Connection Management (ECM)-IDLE state and an ECM-CONNECTED state are defined. The two states are applied to UE and the MME. When the UE in the ECM-IDLE state establishes RRC connection with the E-UTRAN, the UE becomes the ECM-CONNECTED state. The MME in the ECM-IDLE state becomes the ECM-CONNECTED state when it establishes S1 connection with the E-UTRAN. When the UE is in the ECM-IDLE state, the E-UTRAN does not have information about the context of the UE. Accordingly, the UE in the ECM-IDLE state performs procedures related to UE-based mobility, such as cell selection or cell reselection, without a need to receive a command from a network. In contrast, when the UE is in the ECM-CONNECTED state, the mobility of the UE is managed in response to a command from a network. If the location of the UE in the ECM-IDLE state is different from a location known to the network, the UE informs the network of its corresponding location through a tracking area update procedure.

System information is described below.

System information includes essential information that needs to be known by UE in order for the UE to access a BS. Accordingly, the UE needs to have received all pieces of system information before accessing the BS, and needs to always have the up-to-date system information. Furthermore, the BS periodically transmits the system information because the system information is information that needs to be known by all UEs within one cell. The system information is divided into a Master Information Block (MIB) and a plurality of System Information Blocks (SIBs).

The MIB may include a limited number of parameters that are most essential and most frequently transmitted when other information is required to be obtained from a cell. UE first searches for an MIB after downlink synchronization. The MIB may include information, such as an SFN that supports downlink channel bandwidth, a PHICH configuration, and synchronization and operates as a timing criterion and an eNB transmit antenna configuration. The MIB may be transmitted on a broadcast channel (BCH) through broadcasting.

SystemInformationBlockType1 (SIB1) of included SIBs is included in a "SystemInformationBlockType1" message and transmitted. The remaining SIBs other than the SIB1 is included in a system information message and transmitted. To map the SIBs to the system information message may be flexibly configured by a scheduling information list parameter included in the SIB1. In this case, each of the SIBs is included in a single system information message, and only SIBs having the same scheduling requirement value (e.g. cycle) may be mapped to the same system information message. Furthermore, a SystemInformationBlockType2 (SIB2) is always mapped to a system information message corresponding to the first entry within the system information message list of a scheduling information list. A plurality of system information messages may be transmitted within the same cycle. The SIB1 and all the system information messages are transmitted on a DL-SCH.

In addition to broadcast transmission, in an E-UTRAN, the SIB1 may be dedicated-signaled in the state in which it includes a parameter configured like an existing configured value. In this case, the SIB1 may be included in an RRC connection reconfiguration message and transmitted.

The SIB1 includes information related to UE cell access, and defines the scheduling of other SIBs. The SIB1 may include information related to the PLMN identifiers of a network, tracking area code (TAC) and a cell ID, a cell barring status indicative of whether a cell is a cell on which camp-on is possible, the lowest reception level required within a cell which is used as cell reselection criterion, and the transmission time and cycle of other SIBs.

The SIB2 may include radio resource configuration information common to all pieces of UE. The SIB2 may include information related to an uplink carrier frequency and uplink channel bandwidth, an RACH configuration, a page configuration, an uplink power control configuration, a sounding reference signal configuration, a PUCCH configuration supporting ACK/NACK transmission, and a PUSCH configuration.

UE may apply a procedure for obtaining system information and detecting a change of system information to a primary cell (PCell) only. In a secondary cell (SCell), when a corresponding SCell is added, an E-UTRAN may provide all of pieces of system information related to an RRC connection state operation through dedicated signaling. When system information related to a configured SCell is changed, an E-UTRAN may release an SCell that is taken into consideration and subsequently add the changed system information. This may be performed along with a single RRC connection reconfiguration message. An E-UTRAN may configure parameter values different from a value broadcasted within an SCell that has been taken into consideration through dedicated signaling.

UE needs to guarantee the validity of a specific type of system information, and such system information is called required system information. The required system information may be defined as follows.

If UE is an RRC idle state: The UE needs to be guaranteed so that it has the valid versions of the MIB and the SIB1 in addition to the SIB2 to SIB8. This may comply with the support of a radio access technology (RAT) that is taken into consideration.

If UE is an RRC connection state: The UE needs to be guaranteed so that it has the valid versions of the MIB, the SIB1, and the SIB2.

In general, the validity of system information may be guaranteed up to a maximum of 3 hours after the system information is obtained.

In general, service that is provided to UE by a network may be classified into three types as follows. Furthermore, the UE differently recognizes the type of cell depending on what service may be provided to the UE. In the following description, a service type is first described, and the type of cell is described.

1) Limited service: this service provides emergency calls and an Earthquake and Tsunami Warning System (ETWS), and may be provided by an acceptable cell.

2) Suitable service: this service means public service for common uses, and may be provided by a suitable cell (or a normal cell).

3) Operator service: this service means service for communication network operators. This cell may be used by only communication network operators, but may not be used by common users.

In relation to a service type provided by a cell, the type of cell may be classified as follows.

1) An acceptable cell: this cell is a cell from which UE may be provided with limited service. This cell is a cell that has not been barred from a viewpoint of corresponding UE and that satisfies the cell selection criterion of the UE.

2) A suitable cell: this cell is a cell from which UE may be provided with suitable service. This cell satisfies the conditions of an acceptable cell and also satisfies additional conditions. The additional conditions include that the suitable cell needs to belong to a Public Land Mobile Network (PLMN) to which corresponding UE may access and that the suitable cell is a cell on which the execution of a tracking area update procedure by the UE is not barred. If a corresponding cell is a CSG cell, the cell needs to be a cell to which UE may access as a member of the CSG.

3) A barred cell: this cell is a cell that broadcasts information indicative of a barred cell through system information.

4) A reserved cell: this cell is a cell that broadcasts information indicative of a reserved cell through system information.

Figure 4:
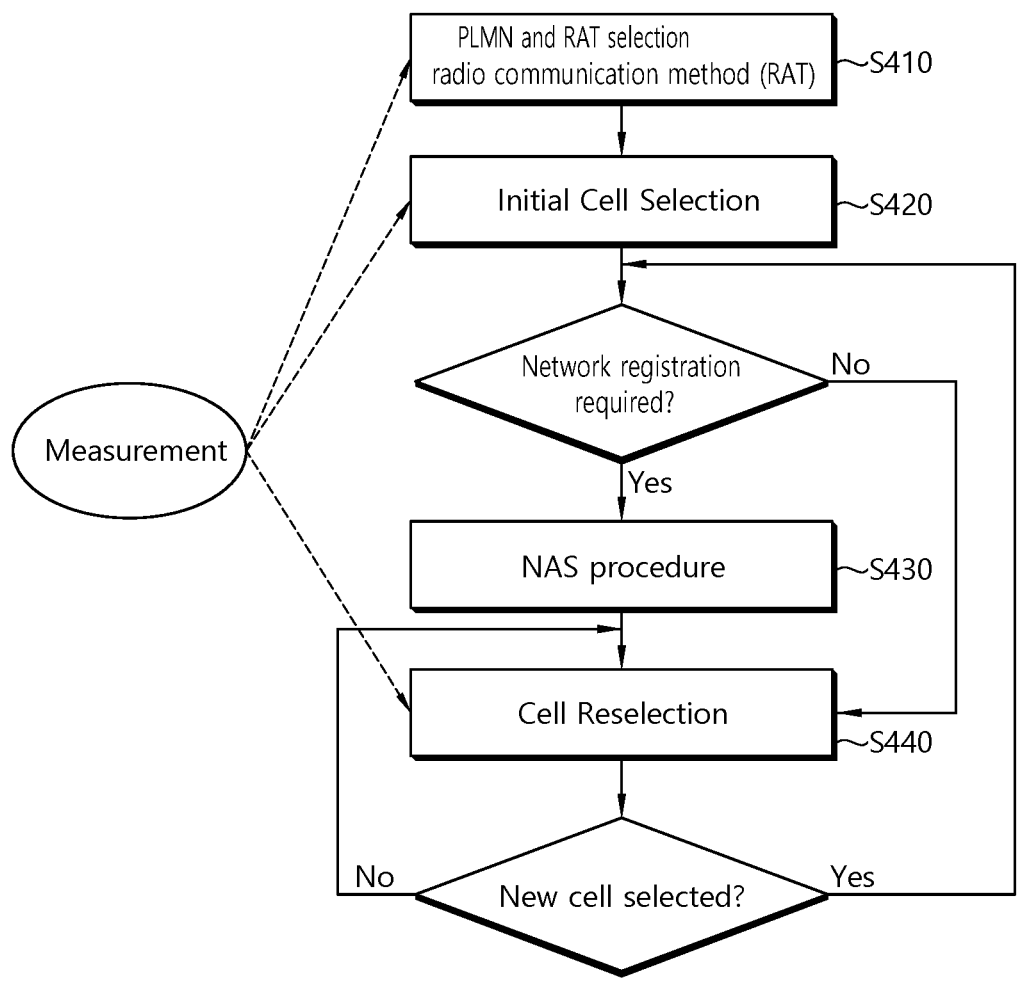
FIG. 4 is a flowchart illustrating the operation of UE in the RRC idle state.

FIG. 4 is a flowchart illustrating the operation of UE in the RRC idle state. FIG. 4 illustrates a procedure in which UE that is initially powered on experiences a cell selection procedure, registers it with a network, and then performs cell reselection if necessary.

Referring to FIG. 4, the UE selects Radio Access Technology (RAT) in which the UE communicates with a Public Land Mobile Network (PLMN), that is, a network from which the UE is provided with service (S410). Information about the PLMN and the RAT may be selected by the user of the UE, and the information stored in a Universal Subscriber Identity Module (USIM) may be used.

The UE selects a cell that has the greatest value and that belongs to cells having measured BS and signal intensity or quality greater than a specific value (cell selection) (S420). In this case, the UE that is powered off performs cell selection, which may be called initial cell selection. A cell selection procedure is described later in detail. After the cell selection, the UE receives system information periodically by the BS. The specific value refers to a value that is defined in a system in order for the quality of a physical signal in data transmission/reception to be guaranteed. Accordingly, the specific value may differ depending on applied RAT.

If network registration is necessary, the UE performs a network registration procedure (S430). The UE registers its information (e.g., an IMSI) with the network in order to receive service (e.g., paging) from the network. The UE does not register it with a network whenever it selects a cell, but registers it with a network when information about the network (e.g., a Tracking Area Identity (TAI)) included in system information is different from information about the network that is known to the UE.

The UE performs cell reselection based on a service environment provided by the cell or the environment of the UE (S440). If the value of the intensity or quality of a signal measured based on a BS from which the UE is provided with service is lower than that measured based on a BS of a neighboring cell, the UE selects a cell that belongs to other cells and that provides better signal characteristics than the cell of the BS that is accessed by the UE. This procedure is called cell reselection differently from the initial cell selection of the No. 2 procedure. In this case, temporal restriction conditions are placed in order for a cell to be frequently reselected in response to a change of signal characteristic. A cell reselection procedure is described later in detail.

Figure 5:
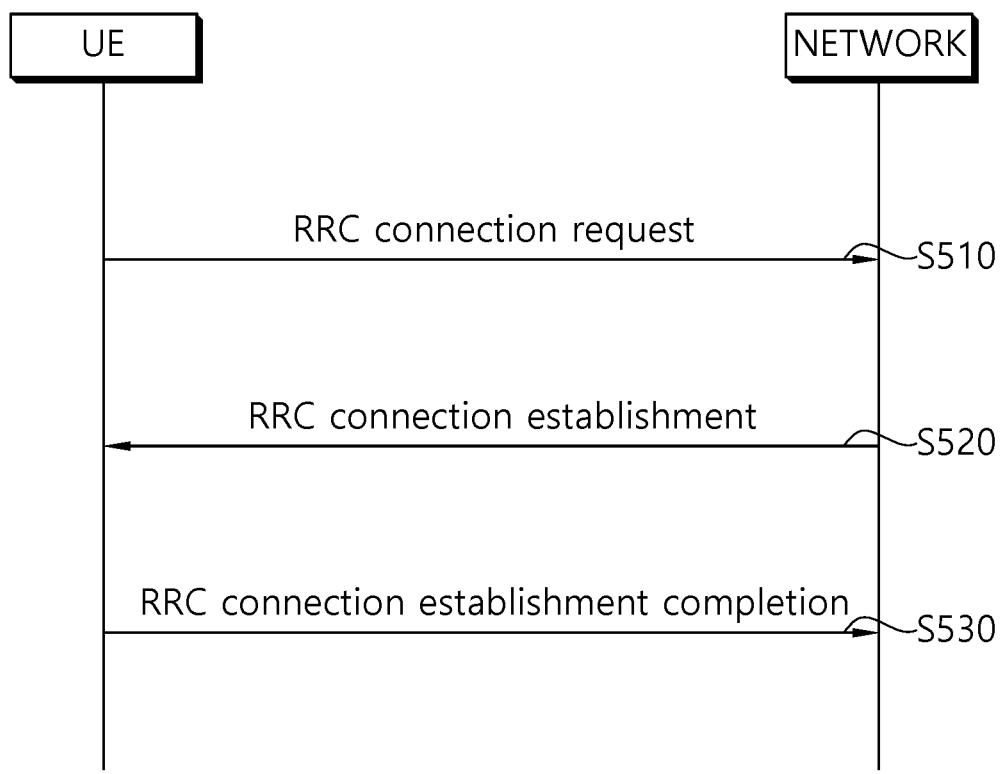
FIG. 5 is a flowchart illustrating a procedure of establishing RRC connection.

FIG. 5 is a flowchart illustrating a procedure of establishing RRC connection.

UE sends an RRC connection request message that requests RRC connection to a network (S510). The network sends an RRC connection establishment message as a response to the RRC connection request (S520). After receiving the RRC connection establishment message, the UE enters RRC connected mode.

The UE sends an RRC connection establishment complete message used to check the successful completion of the RRC connection to the network (S530).

Figure 6:
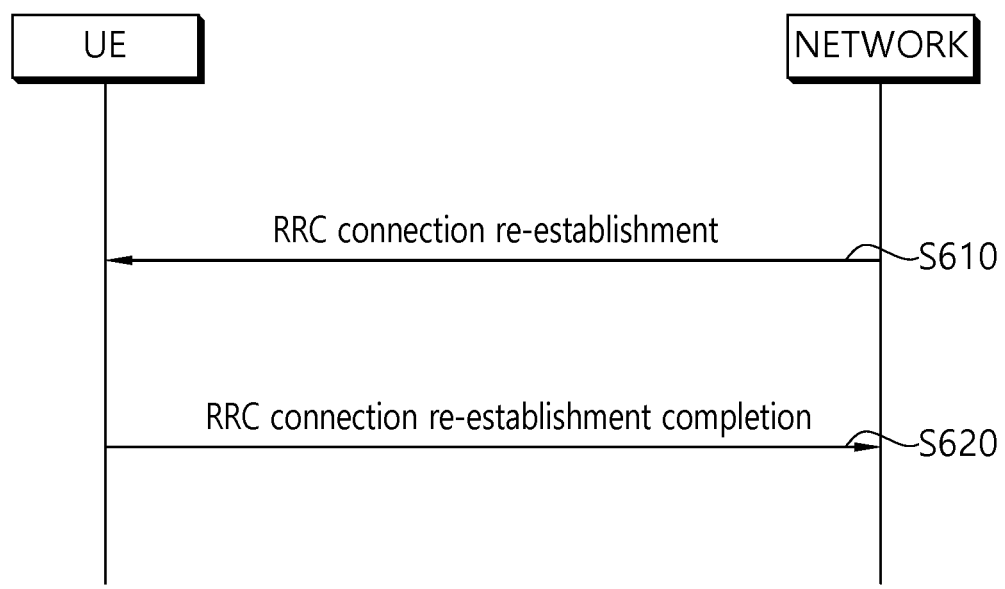
FIG. 6 is a flowchart illustrating an RRC connection reconfiguration procedure.

FIG. 6 is a flowchart illustrating an RRC connection reconfiguration procedure. An RRC connection reconfiguration is used to modify RRC connection. This is used to establish/modify/release RBs, perform handover, and set up/modify/release measurements.

A network sends an RRC connection reconfiguration message for modifying RRC connection to UE (S610). As a response to the RRC connection reconfiguration message, the UE sends an RRC connection reconfiguration complete message used to check the successful completion of the RRC connection reconfiguration to the network (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

When UE is initially powered on, the UE searches for available Public Land Mobile Networks (PLMNs) and selects a proper PLMN from which the UE is able to be provided with service. The PLMN is a network that is deployed or operated by a mobile network operator. Each mobile network operator operates one or more PLMNs. Each PLMN may be identified by Mobile Country Code (MCC) and Mobile Network Code (MNC). Information about the PLMN of a cell is included in system information and broadcasted. The UE attempts to register it with the selected PLMN. If registration is successful, the selected PLMN becomes a Registered PLMN (RPLMN). The network may signalize a PLMN list to the UE. In this case, PLMNs included in the PLMN list may be considered to be PLMNs, such as RPLMNs. The UE registered with the network needs to be able to be always reachable by the network. If the UE is in the ECM-CONNECTED state (identically the RRC connection state), the network recognizes that the UE is being provided with service. If the UE is in the ECM-IDLE state (identically the RRC idle state), however, the situation of the UE is not valid in an eNB, but is stored in the MME. In such a case, only the MME is informed of the location of the UE in the ECM-IDLE state through the granularity of the list of Tracking Areas (TAs). A single TA is identified by a Tracking Area Identity (TAI) formed of the identifier of a PLMN to which the TA belongs and Tracking Area Code (TAC) that uniquely expresses the TA within the PLMN.

Thereafter, the UE selects a cell that belongs to cells provided by the selected PLMN and that has signal quality and characteristics on which the UE is able to be provided with proper service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

A cell selection procedure is basically divided into two types.

The first is an initial cell selection procedure. In this procedure, UE does not have preliminary information about a wireless channel. Accordingly, the UE searches for all wireless channels in order to find out a proper cell. The UE searches for the strongest cell in each channel Thereafter, if the UE has only to search for a suitable cell that satisfies a cell selection criterion, the UE selects the corresponding cell.

Next, the UE may select the cell using stored information or using information broadcasted by the cell. Accordingly, cell selection may be fast compared to an initial cell selection procedure. If the UE has only to search for a cell that satisfies the cell selection criterion, the UE selects the corresponding cell. If a suitable cell that satisfies the cell selection criterion is not retrieved though such a procedure, the UE performs an initial cell selection procedure.

A cell selection criterion may be defined as in Equation 1 below. Following Equation 1 can be referred to as measurement for determining whether or not S-criterion is satisfied.

$$\text{Srxlev} > 0 \text{ AND } \text{Squal} > 0. \quad \text{[Equation 1]}$$

where $$\text{Srxlev} = Q_{rxlevmeas} - (Q_{rxlevmin} + Q_{rxlevminoffset}) - P_{compensation},$$

$$\text{Squal} = Q_{qualmeas} - (Q_{qualmin} + Q_{qualminoffset})$$

In this case, in Equation 1, the variables may be defined as in Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN |
| $Q_{qualminoffset}$ | Offset to the signalled $Q_{qualmin}$ taken into account in the Squal evaluation as a result of a periodic search for a higher priority PLMN while camped normally in a VPLMN |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Qrxlevminoffset and Qqualminoffset, that is, signaled values, are the results of periodic discovery for a PLMN having higher priority while UE camps on a normal cell within a VPLMN, and may be applied only when cell selection is evaluated. As described above, during the periodic discovery of a PLMN having higher priority, UE may perform cell selection evaluation using parameter values stored from another cell of the PLMN having such higher priority.

After UE selects any cell through a cell selection procedure, the intensity or quality of a signal between the UE and a BS may be changed due to the mobility of the UE or a change of a radio environment. Accordingly, if the quality of the selected cell is changed, the UE may select another cell providing better quality.

After the UE selects a specific cell through the cell selection procedure, the intensity or quality of a signal between the UE and a BS may be changed due to a change in the mobility or wireless environment of the UE. Accordingly, if the quality of the selected cell is deteriorated, the UE may select another cell that provides better quality. If a cell is reselected as described above, the UE selects a cell that provides better signal quality than the currently selected cell. Such a procedure is called cell reselection. In general, a basic object of the cell reselection procedure is to select a cell that provides UE with the best quality from a viewpoint of the quality of a radio signal.

In addition to the viewpoint of the quality of a radio signal, a network may determine priority corresponding to each frequency, and may inform the UE of the determined priorities. The UE that has received the priorities preferentially takes into consideration the priorities in a cell reselection procedure compared to a radio signal quality criterion.

As described above, there is a method of selecting or reselecting a cell according to the signal characteristics of a wireless environment. In selecting a cell for reselection when a cell is reselected, the following cell reselection methods may be present according to the RAT and frequency characteristics of the cell.

Intra-frequency cell reselection: UE reselects a cell having the same center frequency as that of RAT, such as a cell on which the UE camps on.

Inter-frequency cell reselection: UE reselects a cell having a different center frequency from that of RAT, such as a cell on which the UE camps on Inter-RAT cell reselection: UE reselects a cell that uses RAT different from RAT on which the UE camps The principle of a cell reselection procedure is as follows.

First, UE measures the quality of a serving cell and neighbor cells for cell reselection.

Second, cell reselection is performed based on a cell reselection criterion. The cell reselection criterion has the following characteristics in relation to the measurements of a serving cell and neighbor cells.

Intra-frequency cell reselection is basically based on ranking. Ranking is a task for defining a criterion value for evaluating cell reselection and numbering cells using criterion values according to the size of the criterion values. A cell having the best criterion is commonly called the best-ranked cell. The cell criterion value is based on the value of a corresponding cell measured by UE, and may be a value to which a frequency offset or cell offset has been applied, if necessary.

Inter-frequency cell reselection is based on frequency priority provided by a network. UE attempts to camp on a frequency having the highest frequency priority. A network may provide frequency priority that will be applied by UEs within a cell in common through broadcasting signaling, or may provide frequency-specific priority to each UE through UE-dedicated signaling. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, a network may provide UE with a parameter (e.g., a frequency-specific offset) used in cell reselection for each frequency. For the intra-frequency cell reselection or the inter-frequency cell reselection, a network may provide UE with a Neighboring Cell List (NCL) used in cell reselection. The NCL includes a cell-specific parameter (e.g., a cell-specific offset) used in cell reselection. For the intra-frequency or inter-frequency cell reselection, a network may provide UE with a cell reselection black list used in cell reselection.

The UE does not perform cell reselection on a cell included in the black list.

Ranking performed in a cell reselection evaluation procedure is described below.

A ranking criterion used to give the priority of a cell is defined as in Equation 2.

$$R_s = Q_{meas,s} + Q_{hyst}, \quad R_n = Q_{meas,n} - Q_{offset}$$ [Equation 2]

In Equation 2, Rs is the ranking criterion of a serving cell on which UE now camps, Rn is the ranking criterion of a neighboring cell, Qmeas,s is the quality value of the serving cell measured by the UE, Qmeas,n is the quality value of the neighboring cell measured by the UE, Qhyst is a hysteresis value for ranking, and Qoffset is an offset between the two cells.

In Intra-frequency, if UE receives an offset "Qoffsets,n" between a serving cell and a neighbor cell, Qoffset=Qoffsets,n. If UE does not Qoffsets,n, Qoffset=0.

In Inter-frequency, if UE receives an offset "Qoffsets,n" for a corresponding cell, Qoffset=Qoffsets,n+Qfrequency. If UE does not receive "Qoffsets,n", Qoffset=Qfrequency.

If the ranking criterion Rs of a serving cell and the ranking criterion Rn of a neighbor cell are changed in a similar state, ranking priority is frequency changed as a result of the change, and UE may alternately reselect the twos. Qhyst is a parameter that gives hysteresis to cell reselection so that UE is prevented from to alternately reselecting two cells.

UE measures RS of a serving cell and Rn of a neighbor cell according to the above equation, considers a cell having the greatest ranking criterion value to be the best-ranked cell, and reselects the cell.

In accordance with the criterion, it may be checked that the quality of a cell is the most important criterion in cell reselection. If a reselected cell is not a suitable cell, UE excludes a corresponding frequency or a corresponding cell from the subject of cell res election.

Hereinafter, radio link failure (RLF) will be described.

UE continues to perform measurements in order to maintain the quality of a radio link with a serving cell from which the UE receives service. The UE determines whether or not communication is impossible in a current situation due to the deterioration of the quality of the radio link with the serving cell. If communication is almost impossible because the quality of the serving cell is too low, the UE determines the current situation to be an RLF.

If the RLF is determined, the UE abandons maintaining communication with the current serving cell, selects a new cell through cell selection (or cell reselection) procedure, and attempts RRC connection re-establishment with the new cell.

In the specification of 3GPP LTE, the following examples are taken as cases where normal communication is impossible.

A case where UE determines that there is a serious problem in the quality of a downlink communication link (a case where the quality of a PCell is determined to be low while performing RLM) based on the radio quality measured results of the PHY layer of the UE A case where uplink transmission is problematic because a random access procedure continues to fail in the MAC sublayer.

A case where uplink transmission is problematic because uplink data transmission continues to fail in the RLC sublayer.

A case where handover is determined to have failed.

A case where a message received by UE does not pass through an integrity check.

An RRC connection re-establishment procedure is described in more detail below.

Figure 7:
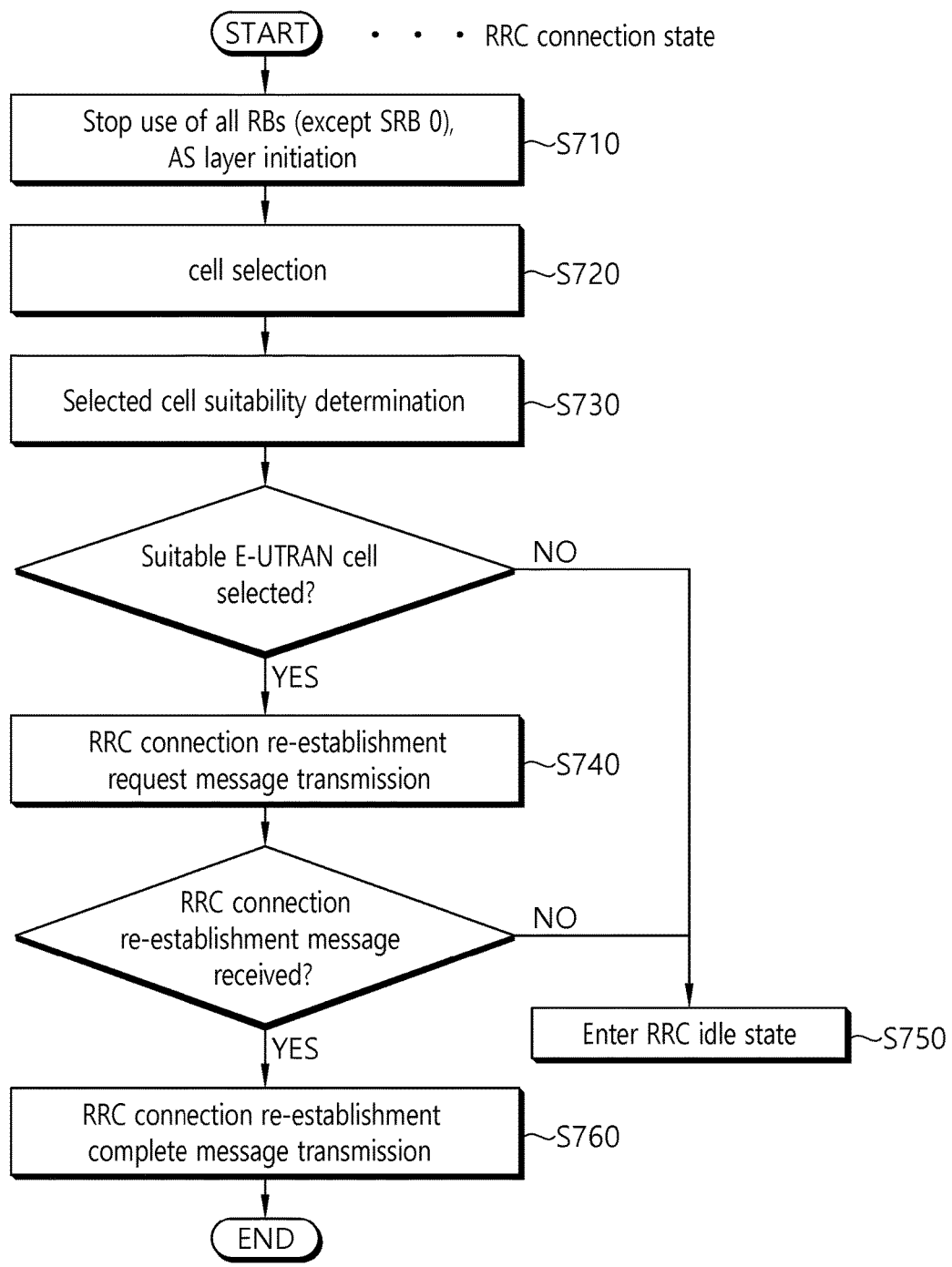
FIG. 7 is a diagram illustrating an RRC connection re-establishment procedure.

FIG. 7 is a diagram illustrating an RRC connection re-establishment procedure.

Referring to FIG. 7, UE stops using all the radio bearers that have been configured other than a Signaling Radio Bearer (SRB) #0, and initializes a variety of kinds of sublayers of an Access Stratum (AS) (S710). Furthermore, the UE configures each sublayer and the PHY layer as a default configuration. In this procedure, the UE maintains the RRC connection state.

The UE performs a cell selection procedure for performing an RRC connection reconfiguration procedure (S720). The cell selection procedure of the RRC connection re-establishment procedure may be performed in the same manner as the cell selection procedure that is performed by the UE in the RRC idle state, although the UE maintains the RRC connection state.

After performing the cell selection procedure, the UE determines whether or not a corresponding cell is a suitable cell by checking the system information of the corresponding cell (S730). If the selected cell is determined to be a suitable E-UTRAN cell, the UE sends an RRC connection re-establishment request message to the corresponding cell (S740).

Meanwhile, if the selected cell is determined to be a cell that uses RAT different from that of the E-UTRAN through the cell selection procedure for performing the RRC connection re-establishment procedure, the UE stops the RRC connection re-establishment procedure and enters the RRC idle state (S750).

The UE may be implemented to finish checking whether the selected cell is a suitable cell through the cell selection procedure and the reception of the system information of the selected cell. To this end, the UE may drive a timer when the RRC connection re-establishment procedure is started. The timer may be stopped if it is determined that the UE has selected a suitable cell. If the timer expires, the UE may consider that the RRC connection re-establishment procedure has failed, and may enter the RRC idle state. Such a timer is hereinafter called an RLF timer. In LTE spec TS 36.331, a timer named "T311" may be used as an RLF timer.

The UE may obtain the set value of the timer from the system information of the serving cell.

If an RRC connection re-establishment request message is received from the UE and the request is accepted, a cell sends an RRC connection re-establishment message to the UE.

The UE that has received the RRC connection re-establishment message from the cell reconfigures a PDCP sublayer and an RLC sublayer with an SRB1. Furthermore, the UE calculates various key values related to security setting, and reconfigures a PDCP sublayer responsible for security as the newly calculated security key values. Accordingly, the SRB 1 between the UE and the cell is open, and the UE and the cell may exchange RRC control messages. The UE completes the restart of the SRB1, and sends an RRC connection re-establishment complete message indicative of that the RRC connection re-establishment procedure has been completed to the cell (S760).

In contrast, if the RRC connection re-establishment request message is received from the UE and the request is not accepted, the cell sends an RRC connection re-establishment reject message to the UE.

If the RRC connection re-establishment procedure is successfully performed, the cell and the UE perform an RRC connection reconfiguration procedure. Accordingly, the UE recovers the state prior to the execution of the RRC connection re-establishment procedure, and the continuity of service is guaranteed to the upmost.

Figure 8:
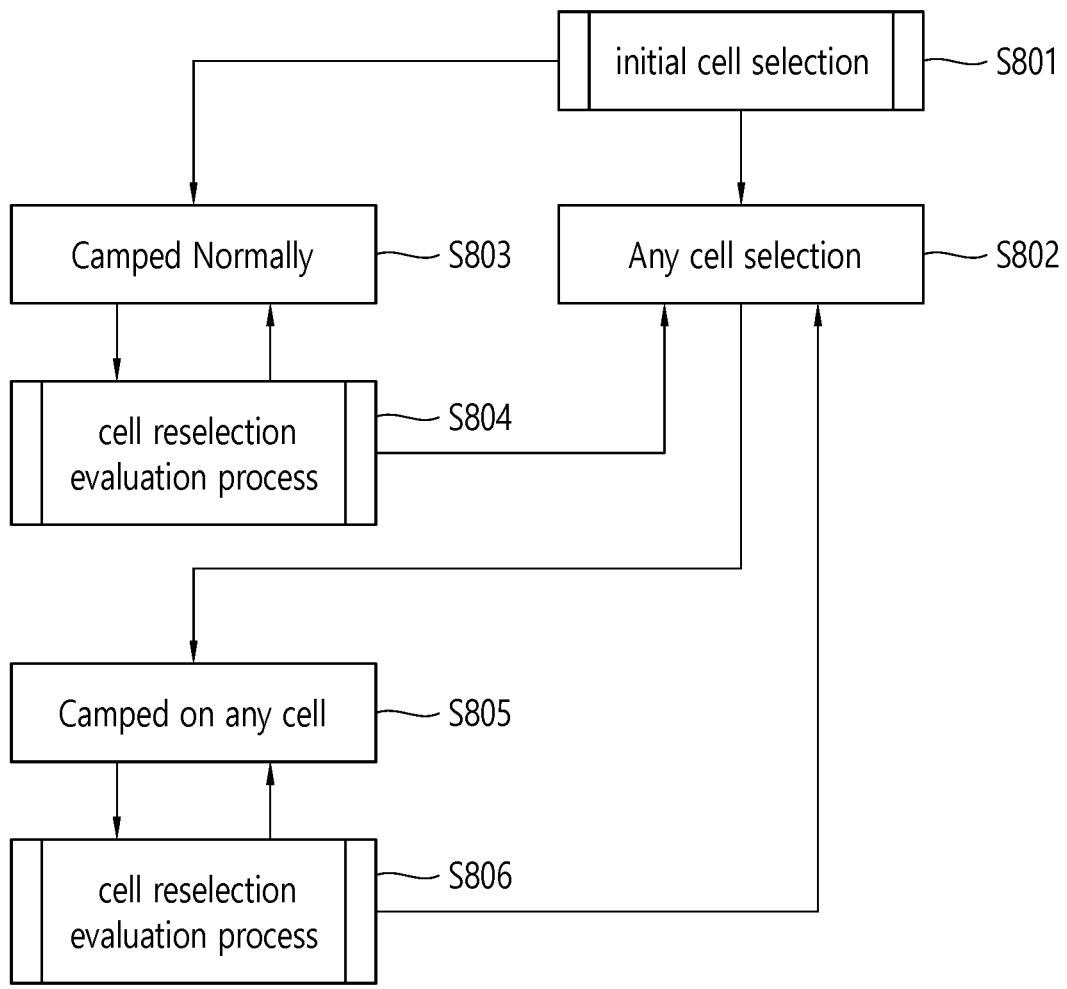
FIG. 8 illustrates sub states where the terminal may have in an RRC_IDLE state and a sub state transition process.

FIG. 8 illustrates sub states where the terminal may have in an RRC_IDLE state and a sub state transition process.

Referring to FIG. 8, a terminal performs an initial cell selection process (S801). The initial cell selection process may be performed when there is no stored cell information with respect to the PLMN or a suitable cell is not found.

If the suitable cell is not found in the initial cell selection process, the terminal transitions to an any cell selection state (S802). The optional cell selection state represents a state which does not camp on in both of a suitable cell and an acceptable cell. The optional cell selection state is a state attempted by the terminal in order to find an acceptable cell of an optional PLMN which may camp on. When the terminal finds no cells which may camp on, the terminal is continuously maintained in an optional cell selection state until the acceptable cell is found.

If the suitable cell is found in the initial cell selection process, the state transits to a normal camp state (S803). The normal camp state represents a state which camps on the normal cell. A paging channel is selected according to information given through system information to motor, and an evaluation process for cell reselection may be performed.

In the normal camp state (S803), if a cell reselection evaluation process (S804) is caused, the cell reselection evaluation process (S804) is performed. If a suitable cell is found in the cell reselection evaluation process (S804), the terminal again transits to the normal camp state (S803).

If an acceptable cell is found in the any cell selection state (S802), the terminal transits to an any cell camped state (S805). The any cell camped state (S805) represents a state of camping on an acceptable cell.

In the any cell camped state (S805), the terminal may select a paging channel according to information given through system information to monitor, and may perform a cell reselection evaluation process (S806). If the acceptable cell is not found in the cell reselection evaluation process (S806), the terminal transits the any cell selection state (S802).

Hereinafter, a D2D operation will be described. In the 3GPP LTE-A, a service related to the D2D operation refers to Proximity based Services (ProSe). Hereinafter, the ProSe is an equivalent concept with the D2D operation and the ProSe may be compatibly used with the D2D operation. The ProSe is now described.

The ProSe includes ProSe direct communication and ProSe direct discovery. The ProSe direct communication presents communication performed by two or more adjacent terminals. The terminals may perform communication using a protocol of a user plane. A ProSe-enabled UE means a UE for supporting a process related to requirements of the ProSe. Unless otherwise defined, the ProSe-enabled UE includes both of a public safety UE and a non-public safety UE. The public safety UE represents a UE for supporting both of a public safety specified function and the ProSe process. The non-public safety UE is a terminal which supports the ProSe process but does not support the public safety specified function.

The ProSe direct discovery is a process where the ProSe-enabled UE discovers another ProSe-enabled UE. In this case, only ability of the two ProSe-enabled UEs is used. An EPC-level ProSe discovery signifies a process where an EPC determines whether 2 ProSe enable terminals are closed to each other, and reports the close state thereof the two ProSe enabled terminals.

Hereinafter, the ProSe direct communication may refer to D2D communication, and the ProSe direct discovery may refer to D2D discovery.

Figure 9:
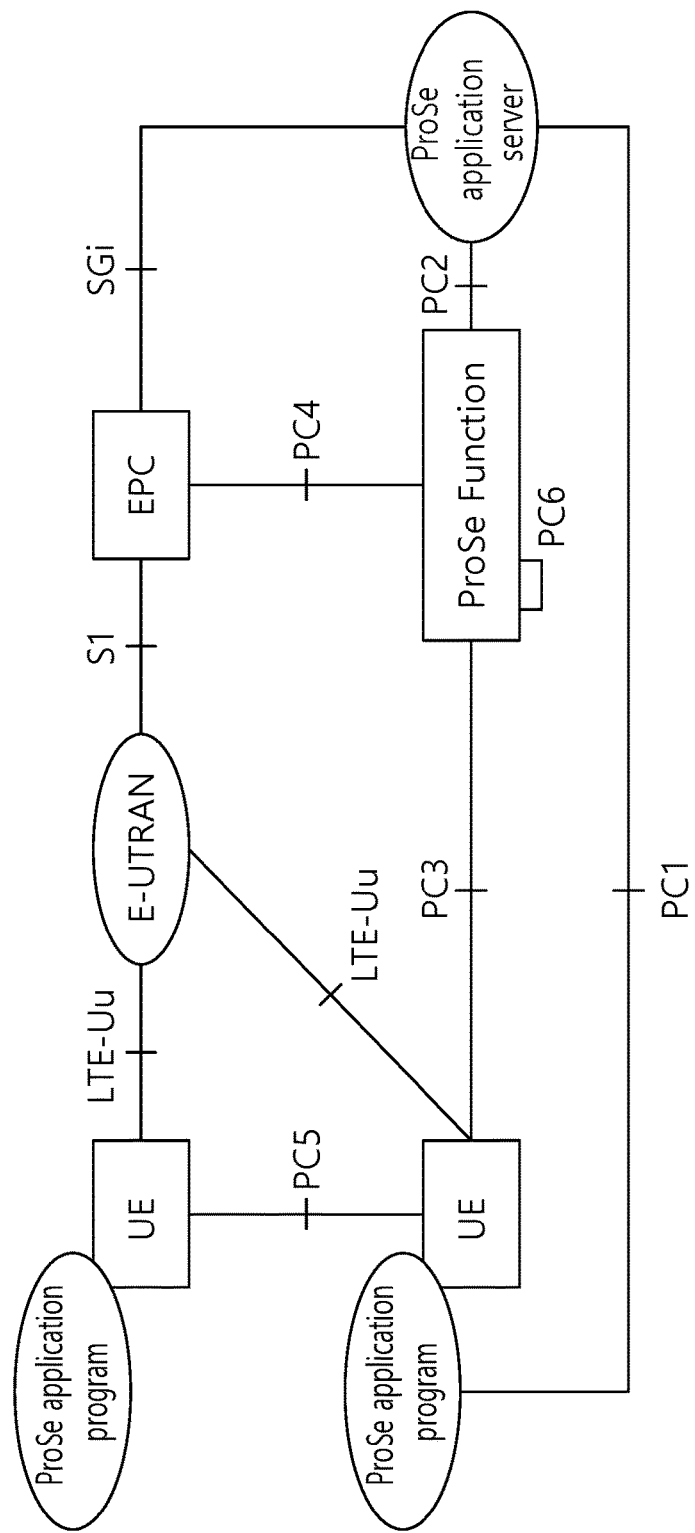
FIG. 9 illustrates a reference structure for a ProSe.

FIG. 9 illustrates a reference structure for a ProSe.

Referring to FIG. 9, the reference structure for a ProSe includes a plurality of terminals having E-UTRAN, EPC, and ProSe application program, a ProSe application (APP) server, and a ProSe function.

An EPC is a representative example of the E-UTRAN. The EPC may include an MME, an S-GW, a P-GW, a policy and charging rules function (PCRF), and a home subscriber server (HSS).

The ProSe application server is a user of ProSe in order to make an application function. The ProSe application server may communicate with an application program in the terminal. The application program in the terminal may use a ProSe ability to make an application function.

The ProSe function may include at least one of following functions but is not limited thereto.

Interworking via a reference point towards the 3rd party applications

Authorization and configuration of the UE for discovery and direct communication)

Enable the function of the EPC level ProSe discovery

ProSe related new subscriber data and handling of data storage, and also handling of ProSe identities Security related function Provide control towards the EPC for policy related function Provide function for charging (via or outside of EPC, e.g., offline charging))

Hereinafter, a reference point and a reference interface will be described in a reference structure for the ProSe.

PC1: a reference point between a ProSe application program in the terminal and a ProSe application program in a ProSe application server. The PC1 is used to define signaling requirements in an application level.

PC2: is a reference point between the ProSe application server and a ProSe function. The PC2 is used to define an interaction between the ProSe application server and a ProSe function. An application data update of a ProSe database of the ProSe function may be an example of the interaction.

PC3: is a reference point between the terminal and the ProSe function. The PC3 is used to define an interaction between the terminal and the ProSe function. Configuration for ProSe discovery and communication may be an example of the interaction.

PC4: is a reference point between an EPC and the ProSe function. The PC4 is used to define an interaction between the EPC and the ProSe function. The interaction lay illustrate when a path for 1:1 communication or a ProSe service for real time session management or mobility management are authorized.

PC5: is a reference point to use control/user plane for discovery, communication, and relay between terminals, and 1:1 communication.

PC6: is a reference point to use a function such as ProSe discovery between users included in different PLMNs.

SGi: may be used for application data and application level control information exchange.

<ProSe Direct Communication (D2D Communication)>.

The ProSe direct communication is a communication mode where two public safety terminals may perform direct communication through a PC 5 interface. The communication mode may be supported in both of a case of receiving a service in coverage of E-UTRAN or a case of separating the coverage of E-UTRAN.

Figure 10:
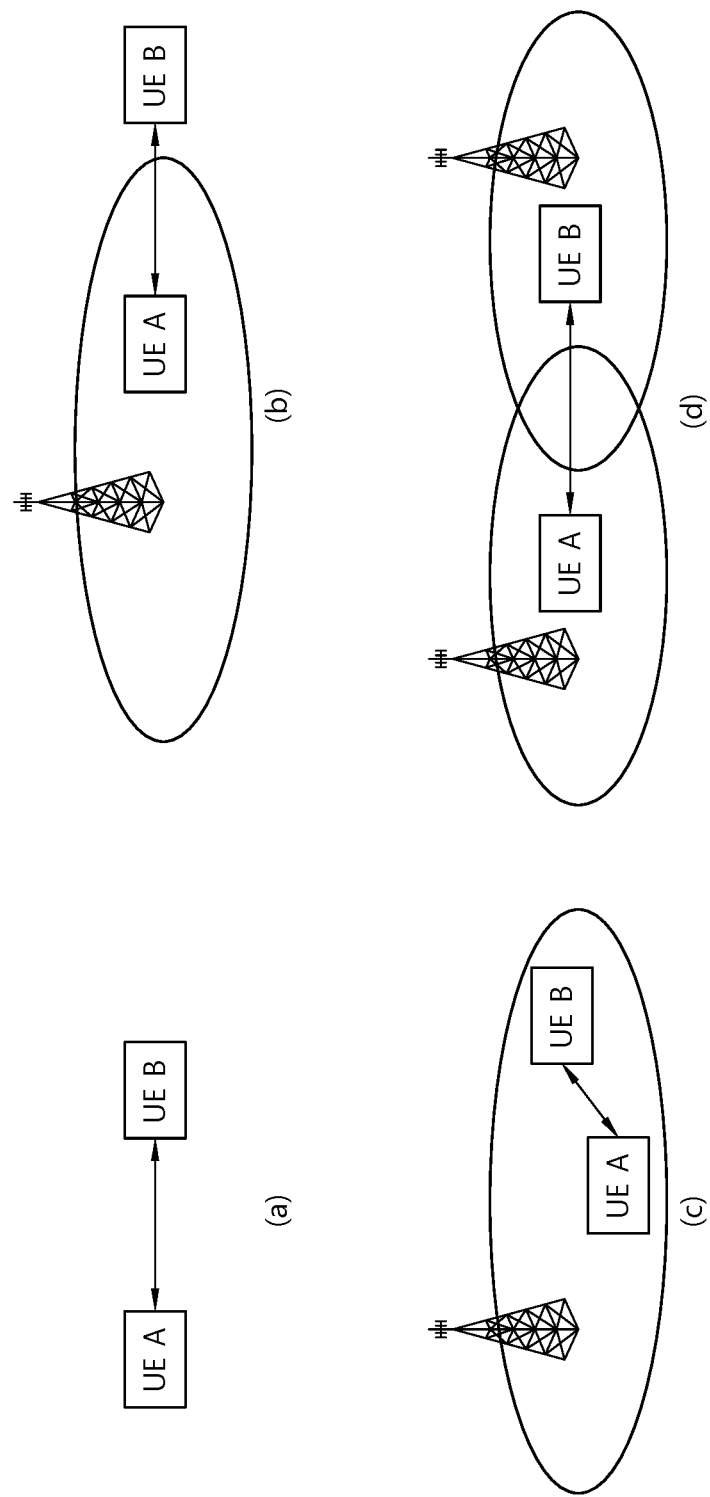
FIG. 10 illustrates arrangement examples of terminals performing ProSe direct communication and cell coverage.

FIG. 10 illustrates arrangement examples of terminals performing ProSe direct communication and cell coverage.

Referring to FIG. 10(a), UEs A and B may be located outside of the cell coverage. Referring to FIG. 10(b), the UE A may be located in the cell coverage and the UE B may be located outside of the cell coverage. Referring to FIG. 10(c), both of UEs A and B may be located in the cell coverage. Referring to FIG. 10(d), the UE A may be located in coverage of a first cell and the UE B may be in coverage of a second cell.

As described above, the ProSe direct communication may be performed between terminals which are provided at various positions.

Meanwhile, following IDs may be used in the ProSe direct communication.

Source layer-2 ID: The source layer-2 ID identifies a sender of a packet in a PC 5 interface.

Purpose layer-2 ID: The purpose layer-2 ID identifies a target of a packet in a PC 5 interface.

SA L1 ID: The SA L1 ID represents an in an ID in a scheduling assignment (SA) in the PC 5 interface.

Figure 11:
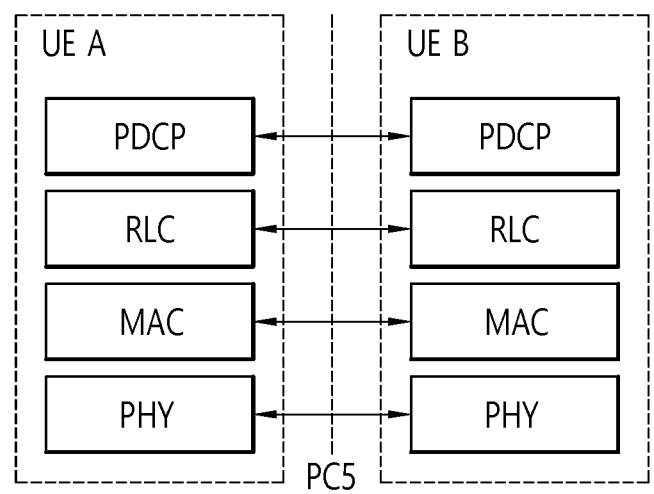
FIG. 11 illustrates a user plane protocol stack for the ProSe direct communication.

FIG. 11 illustrates a user plane protocol stack for the ProSe direct communication.

Referring to FIG. 11, the PC 5 interface includes a PDCH layer, a RLC layer, a MAC layer, and a PHY layer.

There may not be HARQ feedback in the ProSe direct communication. An MAC header may include the source layer-2 ID and the purpose layer-2 ID.

<Radio Resource Assignment for ProSe Direct Communication>.

A ProSe enable terminal may use following two modes with respect to resource assignments for the ProSe direct communication.

1. Mode 1

The mode 2 is a mode for receiving scheduling a resource for the ProSe direct communication from a base station. The terminal should be in a RRC_CONNECTED state according to the mode 1 in order to transmit data. The terminal requests a transmission resource to the base station, and the base station schedules a resource for scheduling assignment and data transmission. The terminal may transmit a scheduling request to the base station and may transmit a Buffer Status Report (ProSe BSR). The base station has data which the terminal will perform the ProSe direct communication and determines whether a resource for transmitting the data is required.

2. Mode 2

The mode 2 is a mode for selecting a direct resource. The terminal directly selects a resource for the ProSe direct communication from a resource pool. The resource pool may be configured by a network or may be previously determined.

Meanwhile, when the terminal includes a serving cell, that is, when the terminal is in an RRC_CONNECTED state with the base station or is located in a specific cell in an RRC_IDLE state, the terminal is regarded to be in coverage of the base station.

If the terminal is located outside of the coverage, only the mode 2 is applicable. If the terminal is located in the coverage, the mode 1 or the mode 2 may be used according to setting of the base station.

If there are no exceptional conditions, only when the base station is configured, the terminal may change a mode from the mode 1 to the mode 2 or from the mode 2 to the mode 1.

<ProSe Direct Discovery (D2D Discovery)>

The ProSe direct discovery represents a process used to discover when the ProSe enabled terminal discovers other neighboring ProSe enabled terminal and refers to D2D direction discovery or D2D discovery. In this case, an E-UTRA wireless signal through the PC 4 interface may be used. Hereinafter, information used for the ProSe direct discovery refers to discovery information.

Figure 12:
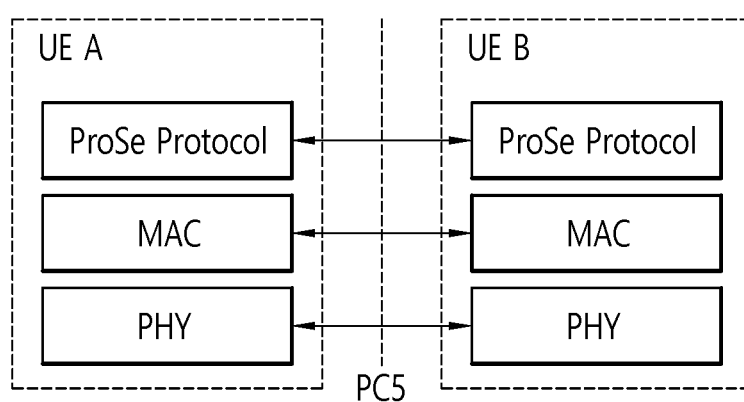
FIG. 12 illustrates a PC 5 interface for D2D discovery.

FIG. 12 illustrates a PC 5 interface for D2D discovery.

Referring to FIG. 12, the PC 5 interface includes an MAC layer, a PHY layer, and a ProSe Protocol layer being an upper layer. Permission for announcement and monitoring of discovery information is handled in the upper layer ProSe Protocol. Contents of discovery information are transparent to an access stratum (AS). The ProSe Protocol allows only valid discovery information to be transferred to the AS for announcement.

An MAC layer receives discovery information from the upper layer ProSe Protocol. An IP layer is not used for transmitting the discovery information. The MAC layer determines a resource used in order to announce the discovery information received from the upper layer. The MAC layer makes and sends a protocol data unit (MAC PDU) to a physical layer. An MAC header is not added.

There are two types of resource assignments for announcing the discovery information.

1. Type 1

The type 1 is a method assigned so that resources for announcing the discovery information are not terminal-specific and the base station provides resource pool configuration for announcing the discovery information to the terminals. The configuration may be included in a system information block (SIB) to be signaled in a broadcast scheme. Alternatively, the configuration may be included in a terminal specific RRC message to be provided. Alternatively, the configuration may be broadcast-signaled or terminal-specific signaled of a different layer from the RRC message.

The terminal selects a resource from an indicated resource pool to announce discovery information using the selected resource. The terminal may announce discovery information through a resource optionally selected during each discovery period.

2. Type 2

The type 2 is a method where resources for announcing the discovery information are terminal-specifically assigned. A terminal in a RRC_CONNECTED state may request a resource for announcing a discovery signal to the base station through a RRC signal. The base station may assign a resource for announcing a discovery signal as an RRC signal. A resource for monitoring the discovery signal in a configured resource pool may be assigned in terminals.

With respect to a terminal in an RRC_IDLE state, a base station may report a type 1 resource pool for announcing the discovery signal as an SIB. Terminals where ProSe direct discovery is allowed use a type 1 resource pool for announcing the discovery information in the RRC_IDLE state. Alternatively, the base station 2) reports that the base station supports the ProSe direct discovery through the SIB but may not provide the resource for announcing the discovery information. In this case, the terminal should enter the RRC_CONNECTED state for announcing the discovery information.

With respect to a terminal in an RRC_CONNECTED state, the base station may configure whether to use a type 1 resource pool or a type 2 resource pool for announcing the discovery information through a RRC signal.

In embodiments of the present invention, channels for D2D communication may be called sidelinks. In this case, an SA channel may be called a physical sidelink control channel (PSCCH), a D2D synchronization signal may be called a sidelink synchronization signal (SLSS) or a D2D synchronization signal (D2DSS), and a control channel for broadcasting basic system information for D2D communication may be called a physical sidelink broadcast channel (PSBCH). In addition, a channel for transmission of a D2D discovery signal may be defined as a physical sidelink discovery channel (PSDCH).

In an LTE-A system (beyond Rel-12 and 13), D2D communication UEs are configured to transmit a PSBCH and an SLSS together or to transmit the SLSS. In addition, the LTE-A system newly defines sidelink RSRP (S-RSRP) for synchronizing with other UEs in D2D communication. That is, when UEs intend to perform D2D communication, S-RSRP is measured and only UEs having S-RSRP equal to or greater than a specific value are synchronized with each other and perform D2D communication. Here, S-RSRP can be measured from a DM-RS on a PSBCH. However, S-RSRP may be measured from a DM-RS on a PSDCH for D2D relay operation.

In addition, an out-of-coverage UE may determine whether the out-of-coverage UE will become a synchronization source which performs D2D relay operation by measuring S-RSRP on the basis of a DM-RS having DM-RS intensity of an SLSS and/or a PSBCH/PSCCH/PSSCH.

Figure 13:
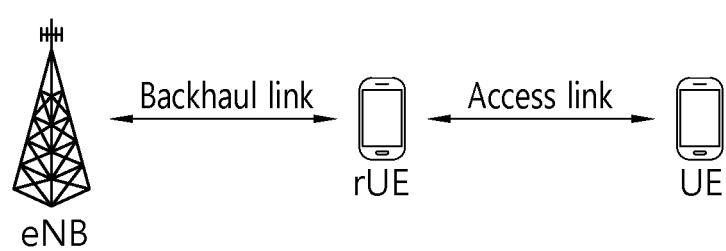
FIG. 13 illustrates an example of D2D relay communication for describing a relationship among an eNB, a relay UE and a normal UE.

FIG. 13 illustrates an example of D2D relay communication for describing a relationship among an eNB, a relay UE and a normal UE.

The relay UE refers to a UE operating as a relay in order to provide network connectivity to a UE located out of coverage of the eNB or having difficulty in direct communication with the eNB. The relay UE can deliver information received from the eNB to the normal UE or deliver information received from the normal UE to the eNB while maintaining a link with the normal UE (e.g., remote UE) as well as a link with the eNB. Here, the link between the eNB and the relay UE may be defined as a backhaul link and the link between the relay UE and the normal UE (e.g., remote UE) may be defined as an access link. Further, a link for direct communication between UEs without an eNB may be defined as a D2D link.

In FIG. 13, the relay UE may select a resource unit corresponding to specific resources in a resource pool which means a set of resources for D2D communication and transmit a D2D signal using the selected resource unit. Here, the D2D signal may refer to a data signal transmitted and received for direct communication between the UEs and a data signal transmitted and received for relay communication between the normal UE and the eNB via the relay UE.

The eNB and/or the relay UE may configure a resource pool for the normal UE (e.g., remote UE), and the normal UE may detect a D2D signal of the relay UE in the resource pool. Here, information about the resource pool can be announced by the eNB to the relay UE and/or the normal UE when the relay UE is located within the coverage of the eNB. When the relay UE is located out of the coverage of the eNB, other UEs may announce the information about the resource pool or the resource pool may be composed of predetermined resources.

In the case of D2D communication, one or more D2D relay UEs may be used. That is, UEs having sidelink RSRP (S-RSRP) equal to or higher than a specific level can operate as relay UEs.

UEs can be classified into an in-network (in-NW) UE (or in-coverage UE) and an out-of-coverage UE depending on whether communication with an eNB is available.

It is assumed that in-coverage UEs are UEs performing smooth UL and/or DL communication with a specific eNB. For example, the in-coverage UE can be defined as a UE having X dBm or higher received signal strengths of signals received from a specific eNB.

Out-of-coverage UEs can receive fundamental control information (e.g., control information broadcasting through system information) for which eNBs guarantee very high reliability but have difficulty in stable transmission and reception of a UE-specific signal. For example, the out-of-coverage UE can be defined as a UE having received signal strength of a signal received from a specific eNB, which is lower than X dBm.

Figure 14:
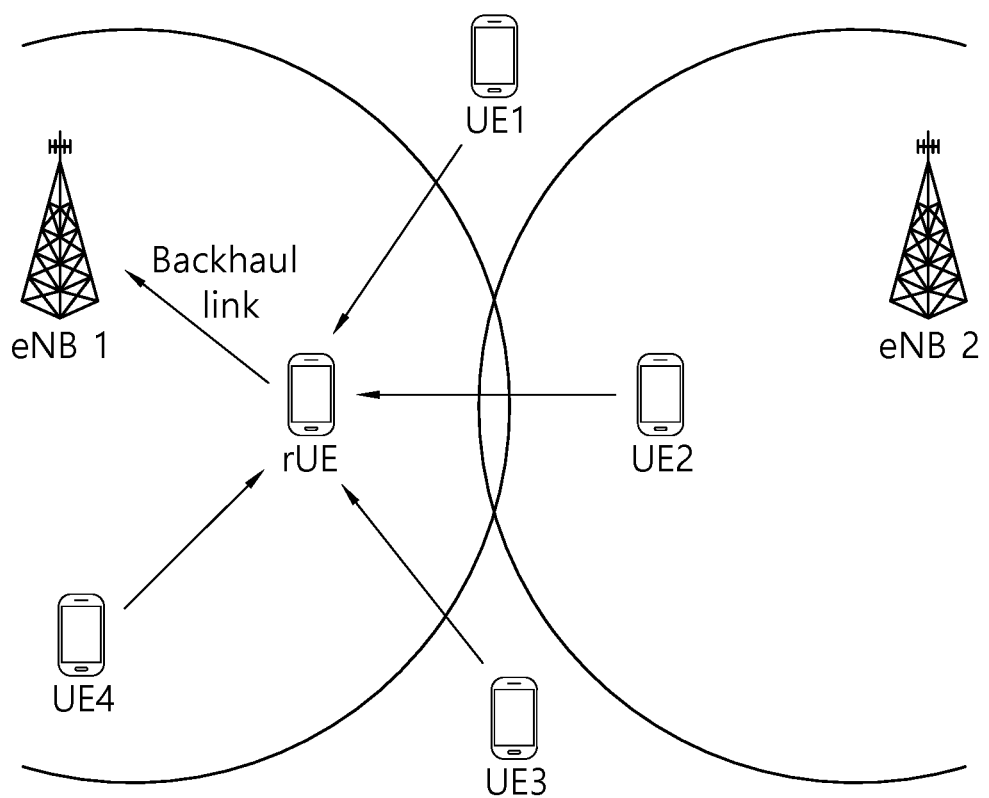
FIG. 14 illustrates an example of D2D relay communication.

FIG. 14 illustrates an example of D2D relay communication.

In FIG. 14, UE1 and UE3 are out-of-coverage UEs, UE2 and UE4 are in-coverage UEs, and rUE refers to a relay UE configured to perform relay operation. Here, UE2 may correspond to an in-coverage UE with respect to a second eNB eNB2 and may correspond to an out-of-coverage UE with respect to a first eNB.

rUE is a UE set to rUE through instruction of the first eNB eNB1 or coordination between rUEs. It is assumed that rUE broadcasts a discovery signal such that neighbor UEs recognize presence of rUE.

For UL transmission, rUE can receive D2D data from an in-NW UE (i.e., UE4) of a serving cell, an in-NW UE (i.e., UE2) of a neighbor cell and out-of-coverage UEs (i.e., UE1 and UE3).

The present invention will be described in detail.

A remote UE performing D2D operation can select a UE for which synchronization will be performed, that is, a synchronization reference UE. Here, the remote UE may select a UE which does not provide a relay service instead of a UE which provides the relay service as the synchronization reference UE.

For example, when a first UE is a remote UE, a second UE is a relay UE providing the relay service and a third UE is a UE which does not provide the relay service, the first UE can select the third UE instead of the second UE as a synchronization reference UE. In other words, the first UE can select the third UE as the synchronization reference UE in spite of selection of the first UE as a relay.

As described above, when the relay UE selected by the remote UE differs from the UE which is the basis of synchronization (i.e., UE which is a synchronization reference), D2D operation efficiency may deteriorate and the remote UE cannot receive appropriate data from the relay UE due to asynchronization between the remote UE and the relay UE when the remote UE performs D2D operation through the relay UE.

To solve the aforementioned problem, a method of selecting, by the remote UE, the relay UE as a UE which is the basis of synchronization (i.e., UE which is a synchronization reference) even when the remote UE performs D2D operation through the relay UE is additionally proposed. In the following description, "UE which is the basis of synchronization", "UE which is a synchronization reference UE", "synchronization reference UE" and "sync reference UE" may be interchangeably used for the sake of convenience. Further, a relay UE may refer to a UE which connects cellular communication and sidelink communication and a remote UE may refer to a UE which performs D2D communication with a network through a relay UE in D2D operation.

Figure 15:
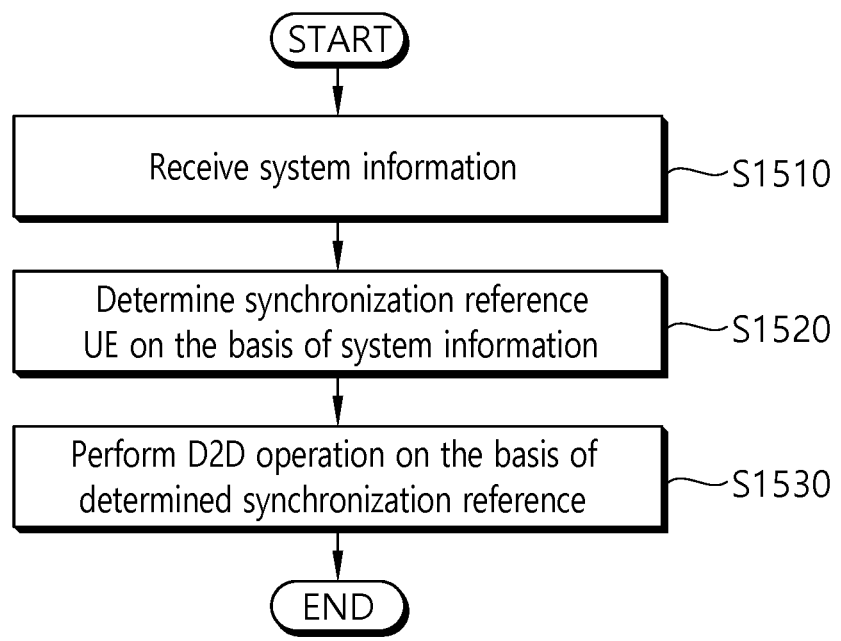
FIG. 15 is a flowchart of a method of selecting a synchronization reference UE by a remote UE according to an embodiment of the present invention.

FIG. 15 is a flowchart of a method of selecting a synchronization reference UE by a remote UE according to an embodiment of the present invention.

Referring to FIG. 15, the remote UE receives sidelink system information (referred to as system information hereinafter) from one or more candidate relay UEs (S1510). Here, the candidate relay UEs may include a UE which can provide the relay service to the remote UE through sidelink, that is, a relay UE and may be one or more relay UEs (i.e., the candidate relay UEs may be a single relay UE or multiple relay UEs). Here, the candidate relay UEs may refer to candidates of a relay UE, and candidate relay UEs and candidates of a relay UE will be used interchangeably in the following description for the sake of convenience.

More specifically, the remote UE may receive system information from each of the candidate relay UEs. Here, the system information can include information indicating whether the relay UE candidate transmitting the system information to the remote UE is an in-coverage UE or an out-of-coverage UE. In addition, the system information may include information indicating whether the relay UE candidate transmitting the system information to the remote UE supports the relay service, that is, the relay UE candidate is a RelaySupport UE.

Here, transmission of a message including the system information through ProSe direct communication is considered. However, transmission of the system information through a ProSe direct discovery message is not excluded. Further, a message received from each candidate relay UE may be a message and/or signaling which has used a discovery relay or an established link.

The remote UE determines a synchronization reference UE on the basis of the system information (S1520). Here, a UE which provides a relay service between a sidelink and a cellular link to the remote UE, that is, a relay UE of the remote UE may be the same as the synchronization reference UE of the remote UE.

More specifically, when the remote UE selects a synchronization reference, the remote UE can select a UE (i.e., relay UE) which provides a relay service between a cellular line and a sidelink as a synchronization reference UE.

Here, a process through which the remote UE selects the synchronization reference UE is as follows.

1) When information (e.g., "inCoverage") indicating in-coverage included in a "sidelink master system information block" (e.g., MasterinformationBlock-SL) received from relay candidate UEs is set to "true" (i.e., the information indicates that the UEs are included in coverage) and information (e.g., "RelaySupport") indicating whether the relay candidate UEs support the relay service is set to "true" in messages received from the relay candidate UEs through a sidelink, the remote UE selects a UE having the highest S-RSRP from the relay candidate UEs as a synchronization reference UE. That is, the remote UE sets the relay (support) UE as priority group 0.

For example, when the remote UE receives system information from each of first, second and third relay candidate UEs, the system information received from the first relay candidate UE indicates that the first relay candidate UE corresponds to in-coverage (i.e., inCoverage=True) and supports the relay service (i.e., RelaySupport=True), and the system information received from the second relay candidate UE also indicates that the second relay candidate UE corresponds to in-coverage (i.e., inCoverage=True) and supports the relay service (i.e., RelaySupport=True), the remote UE can determine a relay candidate UE having the highest S-RSRP between the first relay candidate UE and the second relay candidate UE as the synchronization reference UE thereof. (Here, it is assumed that the system information received from the third relay UE indicates that the third relay UE does not correspond to in-coverage or does not support the relay service.)

2) When the information (e.g., "inCoverage") indicating in-coverage included in a "sidelink master system information block" (e.g., MasterinformationBlock-SL) received from relay candidate UEs is set to "true", the remote UE selects a UE having the highest S-RSRP from among the relay candidate UEs as a synchronization reference UE (i.e., the remote UE sets the relay UT to priority group 1).

For example, when the remote UE receives system information from each of first and second relay candidate UEs, the system information received from the first relay candidate UE indicates that the first relay candidate UE corresponds to in-coverage (i.e., inCoverage=True), and the system information received from the second relay candidate UE also indicates that the second relay candidate UE corresponds to in-coverage (i.e., inCoverage=True), the remote UE can determine a relay candidate UE having the highest S-RSRP between the first relay candidate UE and the second relay candidate UE as the synchronization reference UE thereof. (Here, it is assumed that the system information received from the third relay UE indicates that the third relay UE does not correspond to in-coverage.)

3) The remote UE can determine a relay candidate UE having an SLSS ID which is a part of a set defined with respect to in-coverage as a synchronization reference UE (that is, the remote UE sets the relay UE to priority group 2).

4) The remote UE can determine a UE having the highest S-RSRP from among candidate UEs which do not satisfy the aforementioned conditions as a synchronization reference UE (that is, the remote UE sets the relay UE to priority group 3).

The aforementioned priority group values refer to preference of relay candidate UEs determined by the remote UE as a reference UE. That is, the remote UE can determine a synchronization reference UE in the order of a UE corresponding to priority group 0, a UE corresponding to priority group 1, a UE corresponding to priority group 2 and a UE corresponding to priority group 3. For example, when there are a UE corresponding to priority group 0, a UE corresponding to priority group 1, a UE corresponding to priority group 2 and a UE corresponding to priority group 3, the remote UE can preferentially determine the UE corresponding to priority group 0 as a synchronization reference UE.

The aforementioned information indicating whether a candidate relay UE supports the relay service may refer to RelaySupport information which indicates whether a UE supports a relay service between a cellular link and a sidelink. Here, the RelaySupport information can be included in the sidelink master information block MasterinformationBlock-SL corresponding to system information, and the sidelink master information block can be transmitted over the sidelink (on a sidelink control channel). The RelaySupport information may be included in a relay specific message transmitted over the sidelink control channel.

In selection of a synchronization reference UE by the remote UE, when multiple UEs can be selected as a synchronization reference UE, the remote UE may consider functionality necessary therefor. That is, the remote UE can consider functionality of relay candidate UEs in order to select an appropriate relay candidate UE as a synchronization reference UE.

1) As a first criterion for selection of a relay UE, the remote UE may consider whether a candidate relay UE provides a service for required traffic type (e.g., whether the relay candidate UE provides a one-to-multiple relaying/broadcast traffic service (e.g., MBMS)). For example, when a relay candidate UE (referred to as a second relay candidate UE) provides only a service for one-to-one traffic while another relay UE candidate (referred to as a first relay candidate UE) provides a service for one-to-one traffic (e.g., IP packets) and a service for one-to-multiple traffic (e.g., MBMS), the remote UE can be permitted to assign priority to the first relay UE if the remote UE is interested in the service for one-to multiple traffic.

Here, the remote UE can select a relay candidate UE providing a UE-to-network relay service in which the remote UE is interested rather than a relay candidate UE providing a UE-to-network relay service in which the remote UE is not interested as a synchronization reference UE through priority based selection.

2) As a second criterion for selection of a relay UE, the remote UE may consider whether a candidate relay UE provides higher sidelink quality than other candidate relay UEs. That is, the remote UE can assign priority to a relay UE candidate having high sidelink quality.

Here, the remote UE can select a relay candidate UE having high sidelink quality in preference to relay candidate UEs having low sidelink quality through priority based selection.

The current out-of-coverage UE (e.g., remote UE) may select and/or reselect a synchronization reference thereof using the aforementioned priority rule as a primary criterion and S-RSRP measurement as a secondary criterion. If the UE acquires a UE-to-network service from a relay candidate UE, the UE naturally determines the relay candidate UE as a synchronization reference. That is, when a relay UE is changed at the request of an upper layer, for example, it is desirable to change the synchronization reference UE of the UE (i.e., change the synchronization reference UE to a changed relay UE) according to the change.

Even in the aforementioned proposed operation, it is necessary to further specify a method through which the remote UE selects a final relay UE (i.e., synchronization reference UE) in terms of operation distribution between a UE AS and a UE upper layer. Establishment of a relay link accompanies information about a PLMN checking process and the above-described checking process are available only in an upper layer. (UE AS does not parse a payload of data including the aforementioned information transmitted over a sidelink.) On the other hand, the above-described sidelink quality measurement and synchronization reference UE selection processes correspond to perfect AS operation.

This may mean that the above-described relay UE selection process requires interaction between the UE AS and the upper layer when the aforementioned relay UE selection process accompanies AS operation and upper layer operation. Further, the aforementioned interaction causes discussion of modeling of interaction as follows.

The aforementioned relay UE selection process may be similar to the aforementioned PLMN selection and selection/reselection of a corresponding cell. In PLMN selection, the UE AS may acquire available PLMNs and report them to the upper layer. Then, the upper layer may select one PLMN and report the same to the UE AS. Subsequently, the UE AS can finally perform cell selection and reselection.

Similarly, relay UE selection may be performed as follows. 1) The UE AS may report available relay UE candidates to the upper layer. 2) The upper layer compresses the available relay UE candidates into one or more relay UE candidates. 3) Then, the UE AS selects one relay UE on the basis of radio criteria.

As long as relay UE selection corresponds to upper layer operation, RAN2 determination in relay UE selection needs to be instructed and appropriate modeling therefor is required.

Thereafter, the remote UE may perform D2D operation on the basis of the determined synchronization reference (S1530). Here, the remote UE can perform D2D operation through a UE determined as a relay UE from among relay candidate UEs. That is, the remote UE can perform D2D operation through the determined relay UE (which is the same as the aforementioned synchronization reference UE in this case). Here, details of D2D operation have been described.

The process through which the remote UE selects a synchronization target UE (i.e., synchronization reference UE) may be performed on the basis of information about a UE group or information about MBMS. Hereinafter, the process through which the remote UE selects a synchronization target UE on the basis of information about a UE group or information about MBMS will be described in more detail with reference to the drawings.

Figure 16:
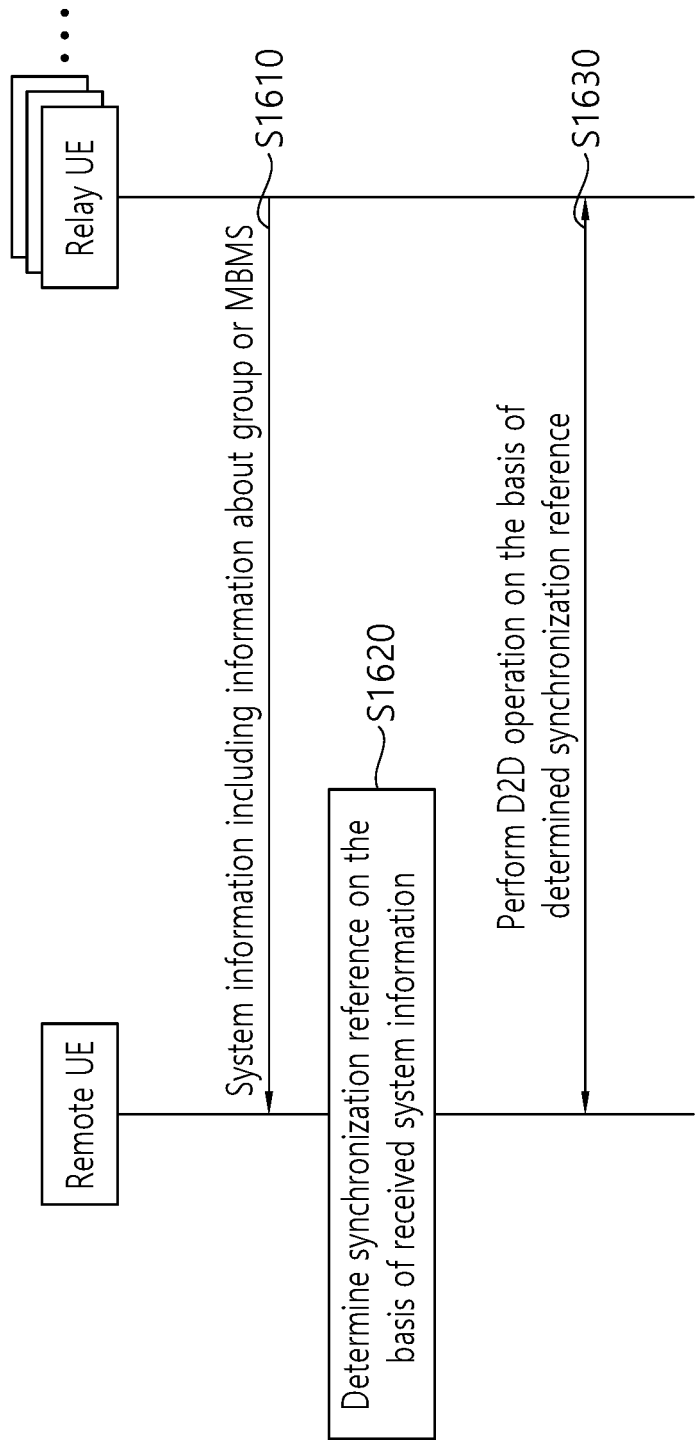
FIG. 16 is a flowchart of a method of selecting a synchronization target UE by a remote UE according to another embodiment of the present invention.

FIG. 16 is a flowchart of a method of selecting a synchronization target UE by a remote UE according to another embodiment of the present invention.

Referring to FIG. 16, the remote UE may receive system information including information about a group or information about MBMS from one or more candidate relay UEs (S1610). Here, the operation of the remote UE to receive the system information has been described above.

Subsequently, the remote UE determines a synchronization reference UE on the basis of the received system information (S1620). Here, a UE which provides a relay service between a sidelink and a cellular link to the remote UE, that is, a relay UE of the remote UE may be the same as the synchronization reference UE of the remote UE, and a specific example of determining the synchronization reference UE by the remote UE has been described above and thus only a difference caused by the information about a group will be described in detail.

More specifically, a relay candidate UE can indicate a relay service provided thereby. For example, 1) A relay candidate UE which can provide a relay service between a cellular link and a sidelink can indicate a group list of the relay service provided thereby.

A specific example of selecting a synchronization reference UE on the basis of indication of group IDs supported with respect to the relay service is as follows.

i) When the remote UE has not selected a synchronization UE yet, and ii) the remote UE discovers one or more SLSS IDs, wherein S-RSRP exceeds a minimum request value defined in a specific hysteresis (e.g., "syncRefMinHyst"; here, syncRefMinHyst may refer to a hysteresis used when a synchronization reference UE is evaluated using absolute comparison.) with respect to SLSS IDs, and the remote UE receives corresponding master information block sidelink messages (e.g., candidate synchronization reference UEs) with respect to the SLSS IDs, the remote UE can select a synchronization reference (SyncRef) UE according to the following priority.

iii) When information (e.g., "inCoverage") indicating in-coverage included in a "sidelink master system information block" (e.g., MasterinformationBlock-SL) received from relay candidate UEs is set to "true" (i.e., the information indicates that the UEs are included in coverage) and the information about a relay support group (e.g., "RelaySupportGroup") includes a group ID related to the remote UE in messages received from the relay candidate UEs through a sidelink, the remote UE selects a UE having the highest S-RSRP among the relay candidate UEs as a synchronization reference UE. (That is, the remote UE sets the relay candidate UE as priority group 0.)

For example, when the remote UE receives system information from each of first, second and third relay candidate UEs, the system information received from the first relay candidate UE indicates that the first relay candidate UE corresponds to in-coverage (i.e., inCoverage=True) and the information about the relay support group includes a group ID related to the remote UE, and the system information received from the second relay candidate UE also indicates that the second relay candidate UE corresponds to in-coverage (i.e., inCoverage=True) and the information about the relay support group includes a group ID related to the remote UE, the remote UE can determine a relay candidate UE having the highest S-RSRP between the first relay candidate UE and the second relay candidate UE as the synchronization reference UE thereof. (Here, it is assumed that the system information received from the third relay UE indicates that the third relay UE does not correspond to in-coverage or does not support the relay service.)

iii) When the information (e.g., "inCoverage") indicating in-coverage included in a "sidelink master system information block" (e.g., MasterinformationBlock-SL) received from relay candidate UEs is set to "true", the remote UE selects a UE having the highest S-RSRP from among the relay candidate UEs as a synchronization reference UE (i.e., the remote UE sets the relay UT to priority group 1).

iii) The remote UE can determine a relay candidate UE having an SLSS ID which is a part of a set defined with respect to in-coverage as a synchronization reference UE (that is, the remote UE sets the relay UE to priority group 2).

iii) The remote UE can determine a UE having the highest S-RSRP from among candidate UEs which do not satisfy the aforementioned conditions as a synchronization reference UE (that is, the remote UE sets the relay UE to priority group 3).

2) A relay UE which provides or can provide a relay service between a cellular link and a sidelink may indicate that a relay service with respect to traffic destined for a group can be provided (that is, one-to-multiple traffic destined for any group when authorized).

A specific example of selecting a synchronization reference UE on the basis of one-to-multiple traffic relay support indication is as follows.

i) When the remote UE has not selected a synchronization UE yet, and ii) the remote UE discovers one or more SLSS IDs, wherein S-RSRP exceeds a minimum request value defined in a specific hysteresis (e.g., "syncRefMinHyst"; here, syncRefMinHyst may refer to a hysteresis used when a synchronization reference UE is evaluated using absolute comparison.) with respect to SLSS IDs, and the remote UE receives corresponding master information block sidelink messages (e.g., candidate synchronization reference UEs) with respect to the SLSS IDs, the remote UE can select a synchronization reference (SyncRef) UE according to the following priority.

iii) When information (e.g., "inCoverage") indicating in-coverage included in a "sidelink master system information block" (e.g., MasterinformationBlock-SL) received from relay candidate UEs is set to "true" (i.e., the information indicates that the UEs are included in coverage) and information about relay support groupcast traffic (e.g., "RelaySupportGroupcastTraffic") is set to "true" in messages received from the relay candidate UEs through a sidelink, the remote UE selects a UE having the highest S-RSRP from the relay candidate UEs as a synchronization reference UE. (That is, the remote UE sets the relay candidate UE as priority group 0.)

For example, when the remote UE receives system information from each of first, second and third relay candidate UEs, the system information received from the first relay candidate UE indicates that the first relay candidate UE corresponds to in-coverage (i.e., inCoverage=True) and the information about the relay support groupcast traffic is set to "true", and the system information received from the second relay candidate UE also indicates that the second relay candidate UE corresponds to in-coverage (i.e., inCoverage=True) and the information about the relay support groupcast traffic is set to "true", the remote UE can determine a relay candidate UE having the highest S-RSRP between the first relay candidate UE and the second relay candidate UE as the synchronization reference UE thereof. (Here, it is assumed that the system information received from the third relay UE indicates that the third relay UE does not correspond to in-coverage or does not support the relay service.)

iii) When the information (e.g., "inCoverage") indicating in-coverage included in a "sidelink master system information block" (e.g., MasterinformationBlock-SL) received from relay candidate UEs is set to "true", the remote UE selects a UE having the highest S-RSRP from among the relay candidate UEs as a synchronization reference UE (i.e., the remote UE sets the relay UT to priority group 1).

iii) The remote UE can determine a relay candidate UE having an SLSS ID which is a part of a set defined with respect to in-coverage as a synchronization reference UE (that is, the remote UE sets the relay UE to priority group 2).

iii) The remote UE can determine a UE having the highest S-RSRP from among candidate UEs which do not satisfy the aforementioned conditions as a synchronization reference UE (that is, the remote UE sets the relay UE to priority group 3).

3) A relay UE which provides or can provide a relay service between a cellular link and a sidelink may indicate that a relay service with respect to traffic for broadcast can be provided (that is, one-to-multiple traffic).

A specific example of selecting a synchronization reference UE on the basis of MBMS traffic relay support indication is as follows.

i) When the remote UE has not selected a synchronization UE yet, and ii) the remote UE discovers one or more SLSS IDs, wherein S-RSRP exceeds a minimum request value defined in a specific hysteresis (e.g., "syncRefMinHyst"; here, syncRefMinHyst may refer to a hysteresis used when a synchronization reference UE is evaluated using absolute comparison.) with respect to SLSS IDs, and the remote UE receives corresponding master information block sidelink messages (e.g., candidate synchronization reference UEs) with respect to the SLSS IDs, the remote UE can select a synchronization reference (SyncRef) UE according to the following priority.

iii) When information (e.g., "inCoverage") indicating in-coverage included in a "sidelink master system information block" (e.g., MasterinformationBlock-SL) received from relay candidate UEs is set to "true" (i.e., the information indicates that the UEs are included in coverage) and information about MBMS relay support (e.g., "MBMSrelaySupport") is set to "true" in messages received from the relay candidate UEs through a sidelink, the remote UE selects a UE having the highest S-RSRP from the relay candidate UEs as a synchronization reference UE. (That is, the remote UE sets the relay candidate UE as priority group 0.)

For example, when the remote UE receives system information from each of first, second and third relay candidate UEs, the system information received from the first relay candidate UE indicates that the first relay candidate UE corresponds to in-coverage (i.e., inCoverage=True) and the information about MBMS relay support is set to "true", and the system information received from the second relay candidate UE also indicates that the second relay candidate UE corresponds to in-coverage (i.e., inCoverage=True) and the information about MBMS relay support is set to "true", the remote UE can determine a relay candidate UE having the highest S-RSRP between the first relay candidate UE and the second relay candidate UE as the synchronization reference UE thereof. (Here, it is assumed that the system information received from the third relay UE indicates that the third relay UE does not correspond to in-coverage or does not support the relay service.)

iii) When the information (e.g., "inCoverage") indicating in-coverage included in a "sidelink master system information block" (e.g., MasterinformationBlock-SL) received from relay candidate UEs is set to "true", the remote UE selects a UE having the highest S-RSRP from among the relay candidate UEs as a synchronization reference UE (i.e., the remote UE sets the relay UT to priority group 1).

iii) The remote UE can determine a relay candidate UE having an SLSS ID which is a part of a set defined with respect to in-coverage as a synchronization reference UE (that is, the remote UE sets the relay UE to priority group 2).

iii) The remote UE can determine a UE having the highest S-RSRP from among candidate UEs which do not satisfy the aforementioned conditions as a synchronization reference UE (that is, the remote UE sets the relay UE to priority group 3).

When the remote UE selects one UE from multiple UEs which provide relay services in order to acquire the relay service, the remote UE may preferentiate a relay candidate UE which provides a service that the remote UE desires, that is, preferentially select a relay candidate UE which provides a service that the remote UE desires as a synchronization reference UE.

For example, when the remote UE selects one UE (i.e., relay candidate UE) from multiple UEs providing relay services in order to acquire a relay service, priority may be assigned to a relay UE providing a relay service to a group related to the remote UE. That is, the remote UE may assign priority to relay candidate UEs which indicate group IDs related to the remote UE as parts of a group of relays providing relay services. In other words, when a relay candidate UE provides a D2D relay service to UEs corresponding to specific groups and a group ID related to the remote UE is included in the specific groups and thus the remote UE can acquire a desired relay service from the relay candidate UE, the remote UE can determine the relay candidate UE as a synchronization reference UE.

Here, whether the aforementioned preferentiation (i.e., preferentiation of a UE providing a relay service for a group related to the remote UE) is applied may optional. For example, when the remote UE intends to acquire a relay service with respect to traffic transmitted/received through a sidelink and transmitted for the group (i.e., a destination ID is set to a group ID), the UE can apply the aforementioned preferentiation. Otherwise, the remote UE may not apply the proposed preferentiation.

Here, when a UE provides a relay service within relay coverage (i.e., in-coverage) (i.e., in the case of a relay UE), the UE can start transmission of a sidelink synchronization signal (SLSS). Then, selection of a relay by the remote UE can be incorporated into the synchronization reference selection process.

The aforementioned priority group values refer to preference of relay candidate UEs determined by the remote UE as a reference UE. That is, the remote UE can determine a synchronization reference UE in the order of a UE corresponding to priority group 0, a UE corresponding to priority group 1, a UE corresponding to priority group 2 and a UE corresponding to priority group 3. For example, when there are a UE corresponding to priority group 0, a UE corresponding to priority group 1, a UE corresponding to priority group 2 and a UE corresponding to priority group 3, the remote UE can preferentially determine the UE corresponding to priority group 0 as a synchronization reference UE.

Thereafter, the remote UE performs D2D operation on the basis of the determined synchronization reference UE (S1630). A specific example of the D2D operation of the remote UE has been described above.

Figure 17:
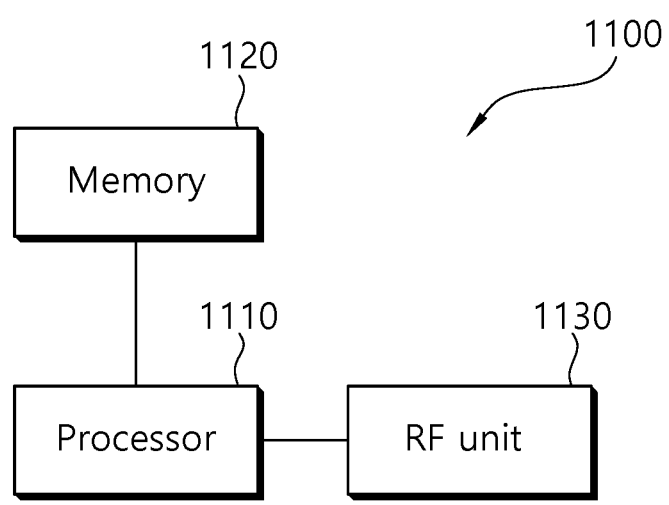
FIG. 17 is a block diagram of a UE which implements embodiments of the present invention.

FIG. 17 is a block diagram of a UE which implements embodiments of the present invention.

Referring to FIG. 17, a UE 1100 includes a processor 1110, a memory 1120 and a radio frequency (RF) unit 1130. The processor 1110 implements the proposed functions, processes and/or methods. For example, the processor 1110 can receive system information from a relay UE through the RF unit 1130. In addition, the processor 1110 can determine a synchronization reference UE on the basis of the received system information and perform D2D operation on the basis of the determined synchronization reference.

The RF unit 1130 is connected to the processor 1110 and transmits/receives RF signals.

The processor may include an ASIC (application-specific integrated circuit), other chipsets, a logic circuit and/or a data processor. The memory may include a ROM (read-only memory), RAM (random access memory), flash memory, a memory card, a storage medium and/or other storage devices. The RF unit may include a baseband circuit for processing RF signals. When embodiments are realized as software, the above-described methods may be implemented as modules (processes, functions, etc.) which execute the aforementioned functions. The modules may be stored in the memory and executed by the processor. The memory may be provided inside or outside of the processor and may be connected to the processor through various known means.

What is claimed is:

1. A method for determining one candidate relay user equipment (UE) in a wireless communication system, the method performed by a remote UE and comprising:
   receiving system information from each of a number of candidate relay UEs; and
   determining the one candidate relay UE as a synchronization reference UE based on the system information and priorities of the candidate relay UEs,
   wherein the determined synchronization reference UE is the same as a relay UE of the remote UE, which provides a relay service between a cellular link and a sidelink,
   wherein the priorities of the candidate relay UEs are determined based on, in the following order, whether each of the candidate relay UEs are in-coverage, a sidelink-reference signal received power (S-RSRP) of each in-coverage candidate relay UE, and whether a sidelink synchronization signal identifier (SLSS ID) is part of a set defined with respect to in-coverage candidate relay UEs, and
   wherein when none of the candidate relay UEs satisfy the priorities for purposes of determining the synchronization reference UE, the remote UE determines the one candidate relay UE as the synchronization reference UE based on the S-RSRP of each of the candidate relay UEs.

2. The method of claim 1, wherein the system information includes information informing the remote UE whether a candidate relay UE transmitting the system information corresponds to an in-coverage UE.

3. The method of claim 2, wherein the system information includes information informing the remote UE whether a candidate relay UE transmitting the system information supports relay.

4. The method of claim 1, wherein, when multiple UEs have a highest priority, the UE having a highest measured quality among the multiple UEs is determined as the synchronization reference UE.

5. The method of claim 1, wherein the system information includes information informing the remote UE of functionality provided by a candidate relay UE.

6. The method of claim 5, wherein the information informing the remote UE of the functionality indicates whether the candidate relay UE supports relay of a multimedia broadcast multicast service (MBMS).

7. The method of claim 6, wherein the remote UE determines a relay candidate UE as the synchronization reference UE when the remote UE wants to be provided with the MBMS and the relay candidate UE provides the MBMS.

8. The method of claim 1, wherein the system information includes information about groups to which relay candidate UEs provide services.

9. The method of claim 8, wherein the remote UE determines a relay candidate UE as the synchronization reference UE when information about the remote UE is included in information about a group to which the relay candidate UE provides a service.

10. The method of claim 1, wherein selection of the synchronization reference UE is performed on an access stratum (AS).

11. A user equipment (UE) comprising:
   a transmitter and receiver; and
   a processor operating in connection with the transmitter and receiver,
   wherein the processor is configured to receive, through the receiver, system information from each of a number of candidate relay UEs and to determine one of the candidate relay UEs as a synchronization reference UE based on the system information and priorities of the candidate relay UEs,
   wherein the determined synchronization reference UE is the same as a relay UE of the remote UE, which provides a relay service between a cellular link and a sidelink,
   wherein the priorities of the candidate relay UEs are determined based on, in the following order, whether each of the candidate relay UEs are in-coverage, a sidelink-reference signal received power (S-RSRP) of each in-coverage candidate relay UE, and whether a sidelink synchronization signal identifier (SLSS ID) is part of a set defined with respect to in-coverage candidate relay UEs, and
   wherein when none of the candidate relay UEs satisfy the priorities for purposes of determining the synchronization reference UE, the remote UE determines the one candidate relay UE as the synchronization reference UE based on the S-RSRP of each of the candidate relay UEs.

* * * * *